United States Patent
Jin

(10) Patent No.: US 12,491,236 B2
(45) Date of Patent: Dec. 9, 2025

(54) GENETICALLY ENGINEERED LIVE BACTERIA AND METHODS OF CONSTRUCTING THE SAME

(71) Applicant: NEW PORTAL LIMITED, Hong Kong (CN)

(72) Inventor: Ye Jin, Hong Kong (CN)

(73) Assignee: NEW PORTAL LIMITED, Hong Kong (CN)

(*) Notice: Subject to any disclaimer, the term of this patent is extended or adjusted under 35 U.S.C. 154(b) by 322 days.

(21) Appl. No.: 18/002,044

(22) PCT Filed: Jul. 5, 2021

(86) PCT No.: PCT/CN2021/104471
§ 371 (c)(1),
(2) Date: Dec. 15, 2022

(87) PCT Pub. No.: WO2022/007741
PCT Pub. Date: Jan. 13, 2022

(65) Prior Publication Data
US 2023/0321211 A1 Oct. 12, 2023

(30) Foreign Application Priority Data
Jul. 7, 2020 (WO) ............... PCT/CN2020/100695

(51) Int. Cl.
*A61K 39/02* (2006.01)
*A61K 39/108* (2006.01)
*A61P 37/04* (2006.01)
*A61K 39/00* (2006.01)

(52) U.S. Cl.
CPC ......... *A61K 39/0258* (2013.01); *A61P 37/04* (2018.01); *A61K 2039/523* (2013.01); *A61K 2039/6037* (2013.01)

(58) Field of Classification Search
None
See application file for complete search history.

(56) References Cited

U.S. PATENT DOCUMENTS

| | | | |
|---|---|---|---|
| 5,478,804 A | 12/1995 | Calabresi et al. | |
| 6,645,490 B2 | 11/2003 | Yarkoni et al. | |
| 9,198,950 B2 | 12/2015 | Mellata | |
| 9,555,127 B2 | 1/2017 | Cueva-Méndez | |
| 9,598,697 B2 * | 3/2017 | Curtiss, III | ............... C12N 1/36 |
| 9,889,164 B2 | 2/2018 | Falb et al. | |
| 11,458,172 B2 | 10/2022 | Jin | |
| 11,696,931 B2 | 7/2023 | Jin | |
| 2009/0208461 A1 * | 8/2009 | Hotz | ............ A61P 37/00 435/252.33 |
| 2013/0209405 A1 | 8/2013 | Curtiss, III | |
| 2017/0067065 A1 * | 3/2017 | Falb | ............... A61K 38/2013 |
| 2018/0325963 A1 | 11/2018 | Isabella et al. | |
| 2020/0323926 A1 | 10/2020 | Jin | |
| 2022/0273730 A1 | 9/2022 | Jin | |

FOREIGN PATENT DOCUMENTS

| | | |
|---|---|---|
| CN | 1055879 A | 11/1991 |
| CN | 1420783 A | 5/2003 |
| CN | 1688699 A | 10/2005 |
| CN | 101010002 A | 8/2007 |
| CN | 104498418 A | 4/2015 |
| CN | 105483067 A | 4/2016 |
| CN | 106676119 A | 5/2017 |
| CN | 107636146 A | 1/2018 |
| CN | 110527655 A | 12/2019 |
| CN | 111246865 A | 6/2020 |
| CN | 111315868 A | 6/2020 |
| EP | 2543720 A1 | 1/2013 |
| IN | 201403506 I3 | 7/2016 |
| JP | 2018512841 A | 5/2018 |
| TW | 201206472 A | 2/2012 |
| WO | 9958652 A2 | 11/1999 |
| WO | 9958652 A3 | 1/2000 |
| WO | 2001005421 A1 | 1/2001 |
| WO | 2009098246 A1 | 8/2009 |
| WO | 2012087483 A1 | 6/2012 |
| WO | 2015118541 A1 | 8/2015 |
| WO | 2016106343 A1 | 6/2016 |
| WO | 2016141108 A1 | 9/2016 |
| WO | 2016183531 A1 | 11/2016 |
| WO | 2016185471 A1 | 11/2016 |
| WO | 2016210373 A2 | 12/2016 |
| WO | 2019014398 A1 | 1/2019 |
| WO | 2019047679 A1 | 3/2019 |

(Continued)

OTHER PUBLICATIONS

NCBI Reference Sequence NC_002128.1 for HlyA Aug. 28, 2016.*
Suzuki, P.J. Fink, The dual functions of Fas ligand in the regulation of peripheral CD8+ and CD4+ T cells, Proc. Natl. Acad. Sci. U.S.A. 97 (4) 1707-1712, 2000.*
Ostroumov D, Fekete-Drimusz N, Saborowski M, Kühnel F, Woller N. CD4 and CD8 T lymphocyte interplay in controlling tumor growth. Cell Mol Life Sci. Feb. 2018;75(4):689-713.*
Rostow et al. Biochimica et Biophysica Acta 1858 (2016) 538-545.*
Engelbart, K. & Gericke, D. (1964). Oncolysis by Clostridia. V. Transplanted Tumors of the Hamster. Cancer Res 24, 239-242.

(Continued)

*Primary Examiner* — Oluwatosin A Ogunbiyi
(74) *Attorney, Agent, or Firm* — EAGLE IP LIMITED

(57) ABSTRACT

A genetically engineered live bacterium comprising at least one effector gene that encodes a medical effector and at least one gene modification that shortens the bacterium's lifespan. After being administered to a subject, the bacterium survives within a time sufficient to allow the medical effector to exert at least one medical action and dies within a time sufficient to minimize pathogenesis to the subject. The bacterium provides an effective treatment of diseases or improving conditions while ensuring the biosafety for medical use.

37 Claims, 10 Drawing Sheets

Specification includes a Sequence Listing.

(56) References Cited

FOREIGN PATENT DOCUMENTS

| WO | 2020014543 A2 | 1/2020 |
|---|---|---|
| WO | 2020151185 A1 | 7/2020 |

OTHER PUBLICATIONS

Thiele, E. H., Arison, R. N. & Boxer, G. E. (1964). Oncolysis by Clostridia. Iv. Effect of Nonpathogenic Clostridial Spores in Normal and Pathological Tissues. Cancer Res 24, 234-238.

Sasaki, T. et al. (2006). Genetically engineered Bifidobacterium longum for tumor-targeting enzyme-prodrug therapy of autochthonous mammary tumors in rats. Cancer science 97, 649-657.

Yazawa, K. et al. (2001). Bifidobacterium longum as a delivery system for gene therapy of chemically induced rat mammary tumors. Breast Cancer Res Treat 66, 165-170.

Lee, C. H., Wu, C. L. & Shiau, A. L. (2008). *Salmonella choleraesuis* as an anticancer agent in a syngeneic model of orthotopic hepatocellular carcinoma. Int J Cancer 122, 930-935.

Pawelek, J. M., Low, K. B. & Bermudes, D. (1997). Tumor-targeted *Salmonella* as a novel anticancer vector. Cancer Res 57, 4537-4544.

Sznol, M., Lin, S. L., Bermudes, D., Zheng, L. M. & King, I. (2000). Use of preferentially replicating bacteria for the treatment of cancer. J Clin Invest 105, 1027-1030.

Cronin, M. et al. (2012). High resolution in vivo bioluminescent imaging for the study of bacterial tumour targeting. PLoS One 7, e30940.

Stritzker, J. et al. (2007). Tumor-specific colonization, tissue distribution, and gene induction by probiotic *Escherichia coli* Nissle 1917 in live mice. International journal of medical microbiology : IJMM 297, 151-162.

Krick, E. L. et al. (2012). Evaluation of Clostridium novyi-NT spores in dogs with naturally occurring tumors. American journal of veterinary research 73, 112-118.

Roberts, N. J. et al. (2014). Intratumoral injection of Clostridium novyi-NT spores induces antitumor responses. Science translational medicine 6, 249ra111.

Min, J. J. et al. (2008). Noninvasive real-time imaging of tumors and metastases using tumor-targeting light-emitting *Escherichia coli*. Molecular imaging and biology : MIB : the official publication of the Academy of Molecular Imaging 10, 54-61.

Yu, B. et al. (2012). Explicit hypoxia targeting with tumor suppression by creating an "obligate" anaerobic *Salmonella typhimurium* strain. Sci Rep 2, 436.

Frahm, M. et al. (2015). Efficiency of conditionally attenuated *Salmonella enterica* serovar Typhimurium in bacterium-mediated tumor therapy. mBio 6(2):e00254-15.

Stern, C. et al. (2015). Induction of CD4(+) and CD8(+) anti-tumor effector T cell responses by bacteria mediated tumor therapy. Int J Cancer 137, 2019-2028.

Hirayama, A. et al. (2009). Quantitative metabolome profiling of colon and stomach cancer microenvironment by capillary electrophoresis time-of-flight mass spectrometry. Cancer Res 69, 4918-4925.

Urasaki, Y., Heath, L. & Xu, C. W. (2012). Coupling of glucose deprivation with impaired histone H2B monoubiquitination in tumors. PLoS One 7, e36775.

Jacob, F. & Monod, J. (1961). Genetic regulatory mechanisms in the synthesis of proteins. J Mol Biol 3, 318-356.

Afif, H., Allali, N., Couturier, M. & Van Melderen, L. (2001). The ratio between CcdA and CcdB modulates the transcriptional repression of the ccd poison-antidote system. Mol Microbiol 41, 73-82.

Zhao, M. et al. (2005). Tumor-targeting bacterial therapy with amino acid auxotrophs of GFP-expressing *Salmonella typhimurium*. Proc Natl Acad Sci U S A 102, 755-760.

Diaz, L. A., Jr. et al. (2005). Pharmacologic and toxicologic evaluation of C. novyi-NT spores. Toxicological sciences : an official journal of the Society of Toxicology 88, 562-575.

Z. Douvlis. (1999) Interference of amino acid patterns and tissue-specific amino acids absorption dominance under the influence of tumor cell protein degradation toxins Medical Hypotheses No. 53 (5), 450-457.

Guillermo De La Cueva-Mendez et al. (2003) Regulatable killing of eukaryotic cells by the prokaryotic proteins Kid and Kis The EMBO Journal No. 22 (2), 246-251.

Lukasz Wieteska et al. (2014)Toxins VapC and PasB from prokaryotic TA modules remain active in mammalian cancer cells Toxins No. 6, 2948-2931.

Yeo, Chewchieng et al. (2016) Heterologous expression of toxins from bacterial Toxin-Antitoxin Systems in eukaryotic cells: strategies and applications Toxins No. 49 (8), 1-16.

Dhakal, B.K. et al. (2012). The UPEC pore-forming toxin alpha-hemolysin triggers proteolysis of host proteins to disrupt cell adhesion, inflammatory, and survival pathways. Cell host & microbe 11, 58-69.

Elsen, S., et al. (2014). A type III secretion negative clinical strain of Pseudomonas aeruginosa employs a two-partner secreted exolysin to induce hemorrhagic pneumonia. Cell host & microbe 15, 164-176.

Gur, C., et al. (2013). Natural killer cell-mediated host defense against uropathogenic *E. coli* is counteracted by bacterial hemolysinA-dependent killing of NK cells. Cell host & microbe 14, 664-674.

Huntley, J.S., et al. (1997). Membrane attack induced by HlyA, a pore-forming toxin of Vibrio cholerae. Human & experimental toxicology 16, 101-105.

Li, M., Zhang, et al. (2007). Aberrant expression of zinc transporter ZIP4 (SLC39A4) significantly contributes to human pancreatic cancer pathogenesis and progression. Proc Natl Acad Sci U S A 104, 18636-18641.

Liu, X., Ding, et al. (2017). Non-hemolytic enterotoxin of Bacillus cereus induces apoptosis in Vero cells. Cellular microbiology 19.

Reboud, E., et al. (2016). Phenotype and toxicity of the recently discovered exlA-positive Pseudomonas aeruginosa strains collected worldwide. Environmental microbiology 18, 3425-3439.

Sastalla, I., et al. (2013). The Bacillus cereus Hbl and Nhe tripartite enterotoxin components assemble sequentially on the surface of target cells and are not interchangeable. PLoS One 8, e76955.

Sathyamoorthy, V., et al. (1997). Biochemical and physiological characteristics of HlyA, a pore-forming cytolysin of Vibrio cholerae serogroup O1. Toxicon 35, 515-527.

Sebastian Felgner, et al. (2017) Tumour-targeting bacteria-based cancer therapics for increased specificity and improved outcome Microb Biotechnol. No. 5 vol. 10 ISSN: 1751-7915.

Smith, M.A., et al. (2015). Antibodies against hemolysin and cytotoxic necrotizing factor type 1 (CNF1) reduce bladder inflammation in a mouse model of urinary tract infection with toxigenic uropathogenic *Escherichia coli*. Infect Immun 83, 1661-1673.

Zhao, M., et al. (2006). Targeted therapy with a *Salmonella typhimurium* leucine-arginine auxotroph cures orthotopic human breast tumors in nude mice. Cancer Res 66, 7647-7652.

Fensterle J et al. (2008) Cancer immunotherapy based on recombinant *Salmonella enterica* serovar Typhimurium aroA strains secreting prostate-specific antigen and cholera toxin subunit B. Cancer Gene Ther. Feb.;15(2):85-93.

Shimazu T, et al. (2014) Regression of solid tumors by induction of MazF, a bacterial mRNA endoribonuclease. J Mol Microbiol Biotechnol. 24(4):228-33.

Bakhtiari R, et al. (2016) Rising Cellular Immune Response after Injection of pVax/iutA: A Genetic DNA Cassette as Candidate Vaccine against Urinary Tract Infection. Iran J Public Health. 45(7):890-6.

Goodall Eca, et al. (2018) The Essential Genome of *Escherichia coli* K-12. mBio. Feb. 20, 2018;9(1):e02096-17.

Habibi M, et al. (2017) Evaluation of prevalence, immunogenicity and efficacy of FyuA iron receptor in uropathogenic *Escherichia coli* isolates as a vaccine target against urinary tract infection. Microb Pathog. Sep.;110:477-483.

Hur J, et al. (2017) Ontology-based literature mining of *E. coli* vaccine-associated gene interaction networks. J Biomed Semantics. Mar. 14;8(1):12.

Jiang, S.N., et al. (2010). Inhibition of tumor growth and metastasis by a combination of *Escherichia coli*-mediated cytolytic therapy

(56) References Cited

OTHER PUBLICATIONS and radiotherapy. Molecular therapy : the journal of the American Society of Gene Therapy 18, 635-642.
Leventhal, D.S, et al. (2020). Immunotherapy with engineered bacteria by targeting the STING pathway for anti-tumor immunity. Nature communications 11, 2739.
Nichols, K.B., et al. (2016). Molecular Characterization of the Vacuolating Autotransporter Toxin in Uropathogenic *Escherichia coli*. J Bacteriol 198, 1487-1498.
Quispe-Tintaya, W., et al.(2013). Nontoxic radioactive Listeria(at) is a highly effective therapy against metastatic pancreatic cancer. Proc Natl Acad Sci U S A 110, 8668-8673.
Yang et al. The Present Study Situation on the Application of Staphylococcal Enterotoxin B (SEB) in Tumor Therapy, (2002) Journal of Microbiology Jul. vol. 22 No. 4.
Jin M., (2000) "Tumor-targeted bacterial as a novelanti-cancer vector" China Biotechnology 20.2 : 49-51.
Olivier Epaulard, et al. (2008) Optimization of a type III secretion system-based Pseudomonas aeruginosa live vector for antigen delivery. Clinical and Vaccine Immunology, American Society for Microbiology, 5 (2), pp. 308-313.
Gazit, G., Hung, G., Chen, X., Anderson, W. F., & Lee, A. S. (1999). Use of the glucose starvation-inducible glucose-regulated protein 78 promoter in suicide gene therapy of murine fibrosarcoma. Cancer research, 59(13), 3100-3106.
Jean, A. T. S., Swofford, C. A., Panteli, J. T., Brentzel, Z. J., & Forbes, N. S. (2014). Bacterial delivery of *Staphylococcus aureus*α-hemolysin causes regression and necrosis in murine tumors. Molecular Therapy, 22(7), 1266-1274.
Forbes N. S. (2010). Engineering the perfect (bacterial) cancer therapy. Nature reviews. Cancer, 10(11), 785-794.
John F. Toso; et al., Phase I Study of the Intravenous Administration of Attenuated *Salmonella typhimurium* to Patients With Metastatic Melanoma, J Clin Oncol., Jan. 1, 2002, 142-152, 20(1), NIH Public Access.
Christopher Groth; et al., Immunosuppression mediated by myeloid-derived suppressor cells (MDSCs) during tumour progression, British Journal of Cancer, 2019, 16-25; 120, Cancer Research UK.
Dmitry I. Gabrilovich; et al., Coordinated regulation of myeloid cells by tumours, Nat Rev Immunol. Apr. 1, 2013, 253-268, 12(4), NIH Public Access.
J. Martin Brown, Tumor Microenvironment and the Response to Anticancer Therapy, Cancer Biology & Therapy, Aug. 13, 2002, 453-458, 1:5, Landes Bioscience.
Hyun Min Jeon; et al., Early growth response 1 regulates glucose deprivation-induced necrosis, Oncology Reports, 2013, 669-675, 29.
Whisstock J; et al., Prediction of protein function from protein sequence and structure, Quarterly Reviews of Biophysics, Aug. 2003, 307-340, 36(3), Cambridge University Press London.
Andrzej Witkowski; et al., Conversion of a β-Ketoacyl Synthase to a Malonyl Decarboxylase by Replacement of the Active-Site Cysteine with Glutamine, Biochemistry, Aug. 18, 1999, 11643-11650, 38, American Chemical Society.
Lev Kisselev, Polypeptide Release Factors in Prokaryotes and Eukaryotes: Same Function, Different Structure, Structure, Jan. 2002, 8-9, 10, Elsevier Science Ltd.
RM Ryan; et al.; Bacterial delivery of a novel cytolysin to hypoxic areas of solid tumors, Gene Therapy, 2009, 329-339, vol. 16, Macmillan Publishers Ltd.
Basso, Pauline, et al. "Pseudomonas aeruginosa pore-forming exolysin and type IV pili cooperate to induce host cell lysis." MBio 8.1 (2017): 10-1128.

\* cited by examiner

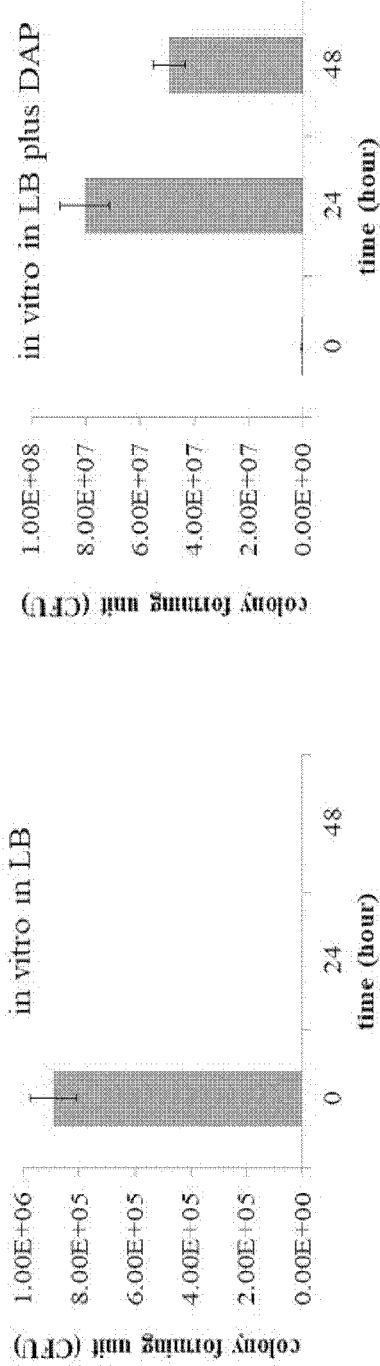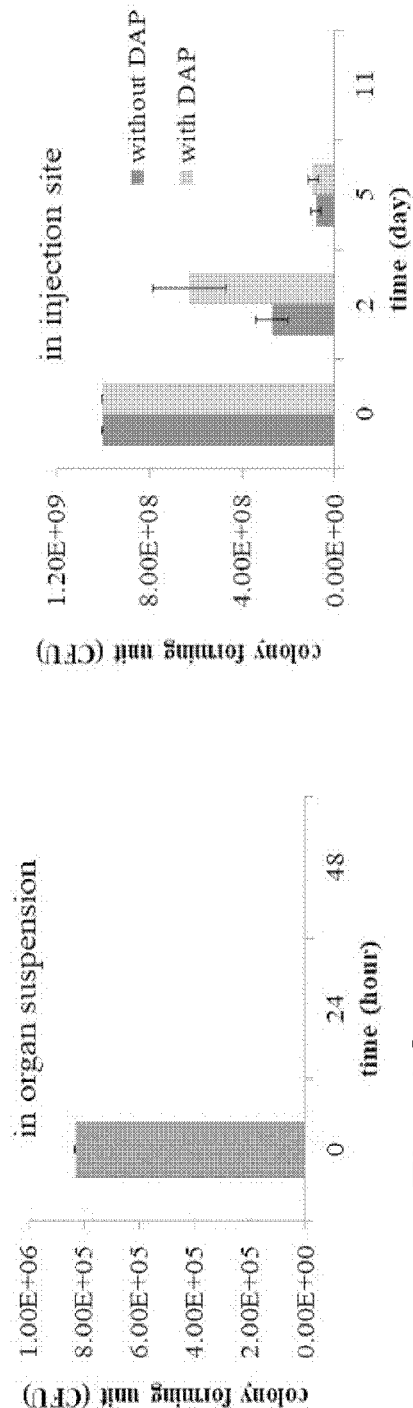

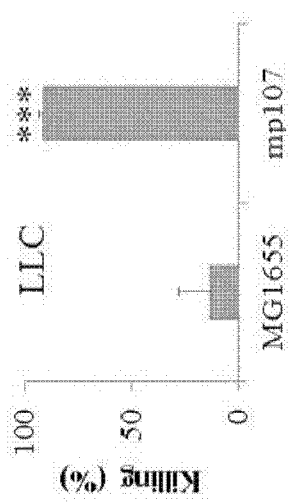
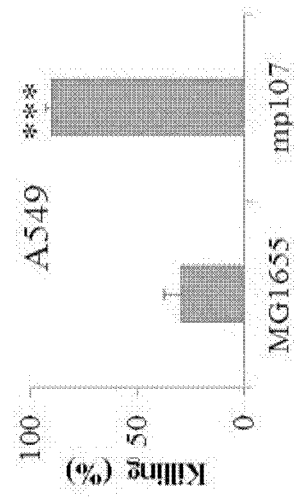
Fig. 2A
Fig. 2B
Fig. 2C

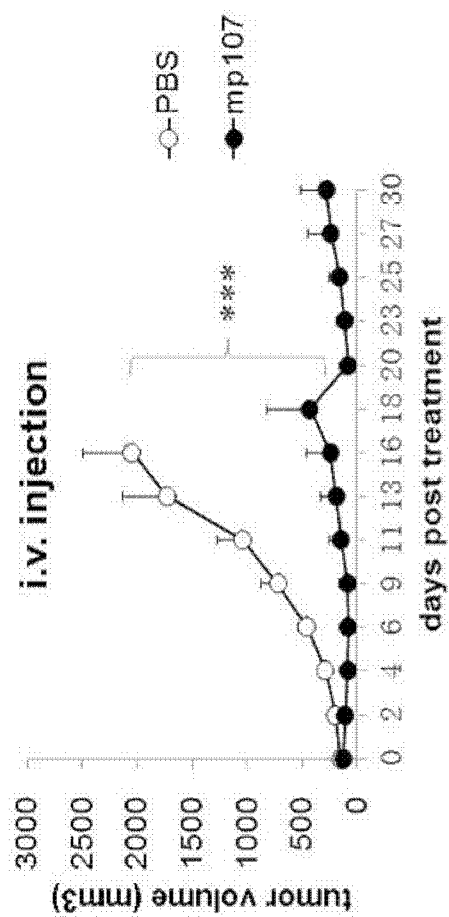
Fig. 3A
Fig. 3B
Fig. 3C

GENETICALLY ENGINEERED LIVE BACTERIA AND METHODS OF CONSTRUCTING THE SAME

REFERENCE TO SEQUENCE LISTING

This application contains a sequence listing in computer readable form, which is incorporated herein by reference in its entirety. The sequence listing, created 29 May 2023, is named "00296937 N026.004.NPOUS sequence listing—revised.txt" and is 35,015 bytes in size.

FIELD OF THE INVENTION

The present invention relates to genetically engineered live bacteria and methods of constructing the same. In particular, the present invention relates to providing genetically engineered live bacteria that can be effective in treating and/or preventing diseases or conditions.

BACKGROUND

Bacteria, naturally occurring or artificially modified, have been used as vaccines or drugs against various diseases such as infectious diseases and more recently cancers. Besides efficacy, the most important concern in using bacteria for medical purposes is safety. For this reason, many efforts have been made to kill the bacteria of interest or genetically modify the bacteria for them to gain the ability to preferably or selectively grow in lesions.

A new type of bacteria for effective treatment of diseases or improving conditions while ensuring the biosafety is highly desirable.

SUMMARY

In the light of the foregoing background, in certain example embodiments, it is an object to provide an alternate bacterium to overcome at least one of the disadvantageous of the prior art.

In one aspect, provided is a genetically engineered live bacterium comprising at least one effector gene that encodes a medical effector; and at least one gene modification that shortens the bacterium's lifespan such that the bacterium, after being administered to a subject, survives within a time sufficient to allow the medical effector to exert at least one medical action, and dies within a time sufficient to minimize pathogenesis to the subject. In some embodiments, the bacterium is derived from a virulent strain.

In some example embodiments, the medical effector is an antigen that can elicit at least one immune response to the subject sufficient to treat a target disease or condition.

In some example embodiments, the medical effector is a therapeutic factor that can elicit at least one immune response in the subject and/or reduce the size of a target lesion sufficient to treat a target disease or condition.

In some example embodiments, the immune response is elicited by CD4+ and/or CD8+ T cells.

In some example embodiments, the medical effector is an antigen or a therapeutic factor expressed from a homologous gene of the bacterium.

In some example embodiments, the medical effector is an antigen or a therapeutic factor expressed from a heterologous gene.

In some example embodiments, the heterologous gene further includes a leader sequence and/or a termination region that improve the heterologous expression in the bacterium.

In some example embodiments, the therapeutic factor is a cytotoxin that causes cell lysis in the target lesion.

In some example embodiments, the target disease or condition is a cancer or tumor and wherein the medical effector causes tumor repression or dissolution in the subject.

In some example embodiments, the time sufficient to minimize pathogenesis is less than 48 hours.

In some example embodiments, the bacterium is incapable of replicating or colonizing within the subject.

In some example embodiments, the gene modification is a deletion or a mutation of at least one essential or auxotrophic gene from the chromosome of the bacterium.

In some example embodiments, the bacterium is an auxotroph in diaminopimelic acid.

In some example embodiments, the gene modification is a deletion of aspartate-semialdehyde dehydrogenase (asd) from the chromosome of the bacterium.

In some example embodiments, the bacterium has a survival time controllable by exposure of the bacterium to one or more modulating effectors that modulate the survival time of the bacterium when administered in vivo.

In some example embodiments, the modulating effector is diaminopimelic acid.

In some example embodiments, the medical effector is a homologous peptide expressed by a gene selected from the group consisting of chuA, yjaA, tspE4C2, sat, sfa, papG, fyuA, iutA, hlyCABD, yfcV and the pks island.

In some example embodiments, the medical effector is a cytotoxin selected from the group consisting of exolysin A of *Pseudomonas aeruginosa* (ExlA), non-hemolytic enterotoxin (Nhe) of *Bacillus cereus*, hemolysins, and vacuolating toxin of *Helicobacter pylori* and combinations thereof.

In some example embodiments, the medical effector is an anticancer factor selected from the group consisting of CpG, cyclic di-nucleotide and tumor antigens.

In some example embodiments, the bacterium is derived from *Escherichia, Salmonella, Shigella, Listeria, Bacteroides, Bifidobacterium, Clostridium, Lactobacillus* or *Lactococcus*.

In some example embodiments, the bacterium is derived from *Escherichia coli*.

In some example embodiments, the bacterium is derived from a strain SH3 deposited at the China General Microbiological Culture Collection Center (CGMCC) under deposit no. 19836.

In some example embodiments, the bacterium expresses a sequence having at least about 80, 85, 90, 95 or 100% sequence identity to all or a fragment of SEQ ID No: 35.

In some example embodiments, the bacterium is derived from a strain mp107 deposited at the China General Microbiological Culture Collection Center (CGMCC) under deposit no. 19835.

In some example embodiments, the bacterium is administered intravenously. In some example embodiments, the bacterium is formulated to be administered intravenously.

In some example embodiments, when administered intravenously, the time sufficient to minimize pathogenesis is less than 48 hours.

In some example embodiments, the bacterium is administered locally. In some example embodiments, the bacterium is formulated to be administered locally.

In some example embodiments, the bacterium, when administered locally at an injection site, survives in the injection site for up to 5 days but dies within 48 hours outside the injection site. In some embodiments, the bacterium is cleared from normal tissue and organs.

In some example embodiments, the bacterium is administered with an equivalent dose of 7.5×10⁹ cfu/kg mouse. In some example embodiments, the bacterium is administered intravenously with an equivalent dose of 7.5×10⁹ cfu/kg mouse.

In some example embodiments, the disease is a cancer or tumor and the bacterium is administered intratumourally.

In some example embodiments, the bacterium is administered intratumorally with an equivalent dose of 5×10⁸ cfu per gram tumor of about 100-200 mm³. In some example embodiments, the bacterium is administered intratumorally with an equivalent dose of 4×10⁹ cfu per gram tumor of about 100-200 mm³. In some example embodiments, the bacterium is administered intratumorally with an equivalent dose of at least 5×10⁸ cfu per gram tumor of about 100-200 mm³.

In another aspect, provided is a live bacterium of *Escherichia coli* sp., comprising a gene deletion of aspartate-semialdehyde dehydrogenase (asd) from the chromosome of the bacterium; wherein the bacterium is derived from a virulent strain.

In some example embodiments, the bacterium expresses at least one effector gene that encodes a medical effector.

In some example embodiments, the bacterium is derived from a strain SH3 deposited at the China General Microbiological Culture Collection Center (CGMCC) under deposit no. 19836.

In some example embodiments, the bacterium further comprising a gene that encodes an exolysin A of *Pseudomonas aeruginosa* (ExlA).

In some example embodiments, the gene has at least about 80, 85, 90, 95 or 100% sequence identity to all or a fragment of SEQ ID NO: 35.

In some example embodiments, the bacterium is derived from a strain mp107 deposited at the China General Microbiological Culture Collection Center (CGMCC) under deposit no. 19835.

In a further aspect, provided is an immunogenic composition, comprising the bacterium of any one of the preceding claims.

In a further aspect, provided is a live bacterium vaccine, comprising the bacterium of any one of the example embodiments and, optionally, an adjuvant.

In a further aspect, provided is a method of treating a disease or condition, comprising administering to a subject a composition comprising an effective amount of the bacterium of any of the example embodiments.

In some example embodiments, the disease is a tumor or a cancer.

In a further aspect, provided is a method of constructing a genetically engineered live bacterium, comprising the steps of: genetically engineering a bacterium such that the bacterium has a short lifespan such that the bacterium, after being administered to a subject, survives within a time sufficient to allow the medical effector to exert at least one medical action and dies within a time sufficient to minimize pathogenesis to the subject, wherein the bacterium is derived from a virulent strain.

In some example embodiments, the method further comprises a step of: genetically engineering the bacterium to express at least one medical effector.

Other example embodiments are discussed herein.

There are many advantages to the present disclosure. In certain embodiments, because the provided bacterium is a live bacterium within the subject in vivo, the medical efficacy is ensured by keeping the integrity and the functionality of their effector molecules.

In certain example embodiments, the short-lived bacteria are advantageous over killed or inactivated bacteria because the short-lived bacteria can survive for a while in the body after administration to exert better medical actions.

In certain embodiments, because the provided bacterium is derived from virulent or pathogenic strains and all or at least some of the virulence factors are maintained to serve as medical effectors, the treatment efficacy is much better than that of non-pathogenic strains. Many antigens and virulent factors of these virulent strains bring various therapeutic potentials, such as eliciting immunity against diseases or directly killing cancer cells. In certain embodiments, only a small amount of the short-lived bacteria being injected either intratumorally or intravenously is sufficient to efficiently repress tumor progression or cure tumors.

In certain embodiments, because the provided bacterium is short-lived, the potential risk of genetic mutations is minimized and the biosafety for medical use is ensured.

In certain embodiments, because the provided bacterium is short-lived and has a high immunogenic and therapeutic efficacy, the bacterium can achieve satisfying treatment effect even when being intravenously administered. In certain embodiments, intravenous or systematic administration of a small amount of the short-lived bacteria is sufficient to achieve a satisfying tumor repression. The bacteria need not to be designed to specifically target to or colonize in a target such as tumor, or limited to be administered locally or intratumorally but still can achieve great efficacy in treating a disease.

In certain embodiments, the short-lived bacteria are advantageous over genetically modified, lesion-specific bacteria because the short-lived bacteria will not easily mutate to lose their short-survival feature whereas lesion-specific bacteria are prone to mutation to lose their lesion-targeting ability.

In certain embodiments, the short-lived bacteria can be used as a vector or vehicle for vaccines or therapeutic agents to treat or prevent various diseases or improving certain conditions. In certain embodiments, the short-lived bacteria can be used for diagnostic purposes.

BRIEF DESCRIPTION OF FIGURES

FIG. 1A shows the number of viable cells of the short-lived bacteria grown in vitro in LB medium for 0, 24 and 48 hours, according to an example embodiment.

FIG. 1B shows the number of viable cells of the short-lived bacteria grown in vitro in LB medium supplemented with diaminopimelic acid (DAP) for 0, 24 and 48 hours, according to an example embodiment.

FIG. 1C shows the number of viable cells of the short-lived bacteria grown ex vivo in homogenized, mixed organ suspension for 0, 24 and 48 hours, according to an example embodiment.

FIG. 1D shows the number of viable cells of the short-lived bacteria injected subcutaneously in mice after 1, 2, 5 and 11 days, according to an example embodiment.

FIG. 2A shows the killing percentages of the murine Lewis lung cancer cell line (LLC) by the short-lived bacteria mp107 and the control strain MG1655, according to an example embodiment.

FIG. 2B shows the killing percentages of the human lung cancer cell line (A549) by the short-lived bacteria mp107 and the control strain MG1655, respectively, according to an example embodiment.

FIG. 2C shows the repression of murine tumor volume by intratumoral (i.t.) injection of control strain MG1655, short-lived bacteria SH3 and short-lived bacteria expressing ExlA mp107 (with two different doses), according to an example embodiment. (P<0.05, ***P<0.001). Error bar, SEM.

FIG. 3A shows the repression of murine lung cancers by intravenous (i.v.) injection of PBS and short-lived bacteria expressing ExlA mp107 at a dose of $7.5 \times 10^9$ cfu/kg mouse, according to an example embodiment. (***P<0.001). Error bar, SEM.

FIG. 3B shows the flow cytometry results of percentages of CD4+ T cells within tumors of mice treated with mp107 or control strain MG1655, according to an example embodiment. (***P<0.001). Error bar, SEM.

FIG. 3C shows the flow cytometry results of percentages of CD8+ T cells within tumors of mice treated with mp107 or control strain MG1655, according to an example embodiment. (***P<0.001). Error bar, SEM.

MICROORGANISM DEPOSIT

Figure 4:
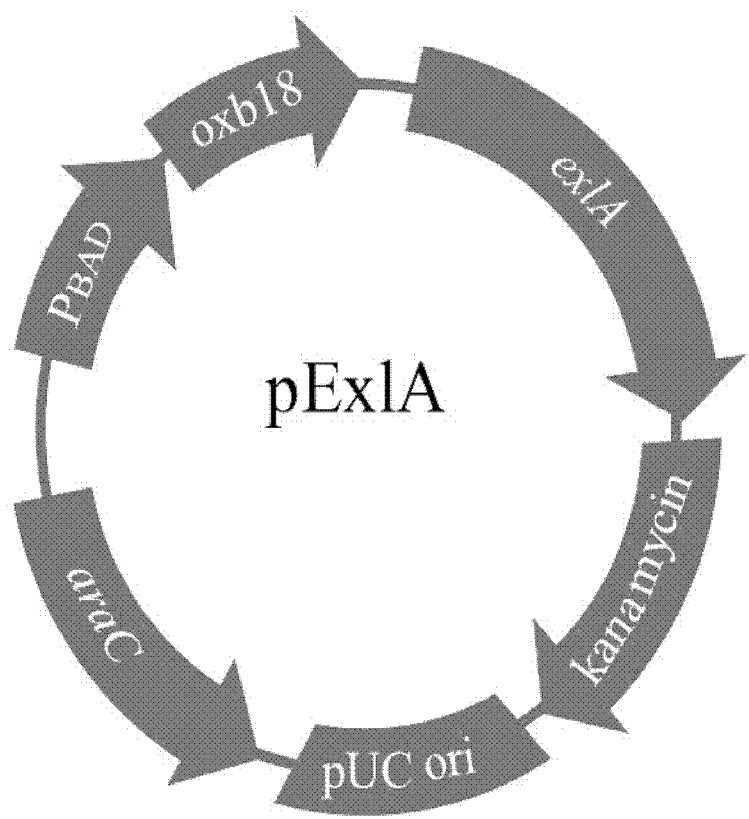
FIG. 4 shows a schematic diagram of map of the plasmid pExlA, according to an example embodiment.

The bacterial strain SH2 was deposited at the China General Microbiological Culture Collection Center (CGMCC) located at No. 3, 1 West Beichen Road, Chaoyang District, Beijing 100101, China under deposit no. 22685 on 10 Jun. 2021. The bacterial strain SH3 was deposited at the China General Microbiological Culture Collection Center (CGMCC) located at No. 3, 1 West Beichen Road, Chaoyang District, Beijing 100101, China under deposit no. 19836 on 18 May 2020. The bacterial strain mp107 was deposited at the China General Microbiological Culture Collection Center (CGMCC) located at No. 3, 1 West Beichen Road, Chaoyang District, Beijing 100101, China under deposit no. 19835 on 18 May 2020. The bacterial strain SH4 was deposited at the China General Microbiological Culture Collection Center (CGMCC) located at No. 3, 1 West Beichen Road, Chaoyang District, Beijing 100101, China under deposit no. 22557 on 18 May 2021. The bacterial strain mp105 was deposited at the China General Microbiological Culture Collection Center (CGMCC) located at No. 3, 1 West Beichen Road, Chaoyang District, Beijing 100101, China under deposit no. 22555 on 18 May 2021. The bacterial strain mp106 was deposited at the China General Microbiological Culture Collection Center (CGMCC) located at No. 3, 1 West Beichen Road, Chaoyang District, Beijing 100101, China under deposit no. 22556 on 18 May 2021.

DETAILED DESCRIPTION

As used herein and in the claims, "comprising" means including the following elements but not excluding others.

As used herein and in the claims, the singular forms "a," "an," and "the" include plural referents unless the context clearly dictates otherwise. For example, "a" gene, as used above, means one or more genes, which can be the same or different.

As used herein, the term "about" is understood as within a range of normal tolerance in the art and not more than ±10% of a stated value. By way of example only, about 50 means from 45 to 55 including all values in between.

As used herein, the phrase "about" a specific value also includes the specific value, for example, about 50 includes 50.

As used herein and in the claims, an "immunogenic composition" is a composition that is effective (e.g. is in a suitable form and amount) to elicit an immune (immunological) response against a disease or condition. In some embodiments, the immunogenic composition is a vaccine that is effective to protect against cancer or tumor.

As used herein and in the claims, an "effective amount", is an amount that is effective to achieve at least a measurable amount of a desired effect. For example, the amount may be effective to elicit an immune response, and/or it may be effective to elicit a protective response, against a pathogen bearing the polypeptide of interest. In some embodiments, the amount may be effective to elicit an immune response against cancer or tumor.

As used herein and in the claims, a "subject" refers to animals such as mammals, including, but not limited to, primates (e.g., humans), cows, sheep, goats, horses, dogs, cats, rabbits, rats, mice and the like.

As used herein and in the claims, "pathogenesis" of a bacterium is a biological mechanism (or mechanisms) that leads to a diseased state in a host or a subject.

As used herein and in the claims, "avirulent" strain (e.g., non-invasive, commensal, or symbiotic) is one that does not cause a disease or detrimental pathogenic effect to the subject. Such bacterium may be naturally occurring, GRAS ("generally, recognized as safe"), or a probiotic bacterium. A "virulent" strain, on the other hand, has at least one virulence factor, may cause a disease or detrimental pathogenic effect to the subject, and is not generally recognized as safe.

A "virulent" strain in certain example embodiments may be genetically modified such that even though it retains or has certain additional virulence factor(s), it does not cause a disease or has no detrimental pathogenic effect to the subject or host.

A "virulence factor" is a molecule produced by bacteria that improve the bacteria's ability to harm a host or cells within a host (e.g., a tumor within a host). Examples of virulence factors include cytotoxins, toxins, hemolysins, proteases, destructive enzymes, and factors that aid in the bacteria's ability to colonize, enter and exit cells, and obtain nutrition.

As used herein, the term "treat," "treating" or "treatment" refers to methods of alleviating, abating or ameliorating a disease or condition symptoms, preventing additional symptoms, ameliorating or preventing the underlying metabolic causes of symptoms, inhibiting the disease or condition, arresting the development of the disease or condition, relieving the disease or condition, causing regression of the disease or condition, relieving a condition caused by the disease or condition, or stopping the symptoms of the disease or condition either prophylactically and/or therapeutically.

As used herein and in the claims, "short-lived" bacterium or bacterium having a "short lifespan" refers to a bacterium that can only survive for a short period of time after administration to a subject in vivo, for example, within a few hours (say, 1-3 hours) to a few days (say 1-3 days), depending on the amount of the bacteria that are administered and the way by which they are administered. In certain embodiments, the "short-lived" bacterium is unable to replicate or colonize within the subject in vivo after administration.

As used herein and in the claims, a bacterium "dies" refers to a bacterium has permanent cessation of its life.

As used herein and in the claims, "attenuated" bacterium refers to a bacterium with reduced virulence or infectivity than the parent form or strain.

As used herein and in the claims, "medical effector" refers to an agent which exerts at least one medical action to a disease or a condition. Examples of medical effectors include, but are not limited to a therapeutic factor, an antigen, a peptide, and a cytotoxin.

As used herein and in the claims, "exerting a medical action" to a disease or condition in a subject is to cause a biological change that treats the disease or condition in the subject. Examples of medical actions include, but are not limited to, eliciting an immune response, causing cell lysis within a disease lesion, inhibiting biological pathways, binding to a receptor, inhibiting a receptor, inhibiting cellular processes in a target cell or organism, and inhibiting or reducing production of one or more factors that cause or maintain the disease or condition. Cellular processes include, but are not limited to, DNA replication, RNA translation, cell division, and maintaining cellular homeostasis.

In certain example embodiments, it is highly desirable to develop a new type of bacteria that possess the advantages of both the killed and the live bacteria and, at the meantime avoid their respective shortcomings.

In certain example embodiments, provided are bacteria that are short-lived bacteria. When the short-lived bacteria are administered in vivo, the bacteria survive at temporal scales of hours. The life span of the short-lived bacteria can be modified artificially by complementing the bacterial suspension with specific compounds or molecules. Because the short-lived bacteria are alive when being administered, the effector molecules produced by them are kept intact and functional. Because the short-lived bacteria die in the body hours or days after the administration, the pathogenesis is minimized.

In certain example embodiments, provided are pharmaceutical compositions comprising the genetically engineered bacteria.

In certain example embodiments, the short-lived bacteria may be generated by deleting one or certain essential genes. Alternatively, auxotrophs of bacteria can be genetically constructed by mutating or deleting relevant auxotrophic genes. The resulting mutant bacteria may have varying, relatively short life spans. Some of them may die quickly in the body depending on the nutrient content in the growth environment where they are administered. If the growth environment contains residual amounts of nutrients or compounds on which the bacteria temporarily live on, then the bacteria can survive longer.

Numbered Embodiments—Set 1

1. A genetically engineered live bacterium comprising
   at least one effector gene that encodes at least one medical effector; and
   at least one gene modification that shortens the bacterium's lifespan such that the bacterium, after being administered to a subject, survives within a time sufficient to allow the medical effector to exert at least one medical action and dies within a time sufficient to minimize pathogenesis to the subject;
   wherein the bacterium is derived from a virulent strain.

2. The bacterium of embodiment 1, wherein the medical effector is an antigen that can elicit at least one immune response in the subject sufficient to treat a target disease or condition.

3. The bacterium of embodiment 1, wherein the medical effector is a therapeutic factor that can elicit at least one immune response in the subject and/or reduce the size of a target lesion sufficient to treat a target disease or condition.

4. The bacterium of embodiments 2 or 3, wherein the immune response is elicited by CD4+ and/or CD8+ T cells.

5. The bacterium of embodiment 1, wherein the medical effector is an antigen or a therapeutic factor expressed from a homologous gene of the bacterium.

6. The bacterium of embodiment 1, wherein the medical effector is an antigen or a therapeutic factor expressed from a heterologous gene.

7. The bacterium of embodiment 6, wherein the heterologous gene further includes a leader sequence and/or a termination region that improve heterologous expression in the bacterium.

8. The bacterium of embodiments 3 or 6, wherein the therapeutic factor is a cytotoxin that causes cell lysis in the target lesion.

9. The bacterium of embodiments 2 or 3, wherein the target disease or condition is cancer or a tumor and wherein the medical effector causes tumor repression in the subject.

10. The bacterium of embodiment 1, wherein the bacterium is incapable of replicating or colonizing within the subject.

11. The bacterium of embodiment 1, wherein the gene modification is a deletion or a mutation of at least one essential or auxotrophic gene from a chromosome of the bacterium.

12. The bacterium of any one of the preceding embodiments, wherein the bacterium is an auxotroph in diaminopimelic acid.

13. The bacterium of any one of the preceding embodiments, wherein the gene modification is a deletion of aspartate-semialdehyde dehydrogenase (asd) from a chromosome of the bacterium.

14. The bacterium of any one of the preceding embodiments, wherein the bacterium has a survival time controllable by exposure of the bacterium to one or more modulating effectors that modulate the survival time of the bacterium when administered in vivo.

15. The bacterium of embodiment 14, wherein the modulating effector is diaminopimelic acid.

16. The bacterium of any one of the preceding embodiments, wherein the medical effector is a homologous peptide expressed by a gene selected from the group consisting of chuA, yjaA, tspE4C2, sat, sfa, papG, fyuA, iutA, hlyCABD, yfcV and pks island.

17. The bacterium of any one of the preceding embodiments, wherein the medical effector is a cytotoxin selected from the group consisting of exolysin A of *Pseudomonas aeruginosa* (ExlA), non-hemolytic enterotoxin (Nhe) of *Bacillus cereus*, hemolysins, and vacuolating toxin of *Helicobacter pylori* and combinations thereof.

18. The bacterium of any one of the preceding embodiments, wherein the medical effector is an anticancer factor selected from the group consisting of CpG, cyclic dinucleotide and tumor antigens.

19. The bacterium of any one of the preceding embodiments, wherein the bacterium is derived from *Escherichia*, *Salmonella*, *Shigella*, *Listeria*, *Bacteroides*, *Bifidobacterium*, *Clostridium*, *Lactobacillus* or *Lactococcus*.

20. The bacterium of any one of the preceding embodiments, wherein the bacterium is derived from *Escherichia coli*.

21. The bacterium of any one of the preceding embodiments, wherein the bacterium is derived from a strain SH3 deposited at the China General Microbiological Culture Collection Center (CGMCC) under deposit no. 19836.

22. The bacterium of any one of the preceding embodiments, wherein the bacterium expresses a sequence having at least about 80, 85, 90, 95 or 100% sequence identity to all or a fragment of SEQ ID No: 35.

23. The bacterium of any one of the preceding embodiments, wherein the bacterium is derived from a strain mp107 deposited at the China General Microbiological Culture Collection Center (CGMCC) under deposit no. 19835.

24. The bacterium of any one of the preceding embodiments, wherein the bacterium is formulated to be administered intravenously.

25. The bacterium of any one of the preceding embodiments, wherein, when administered intravenously, the time sufficient to minimize pathogenesis is less than 48 hours.

26. The bacterium of any one of the preceding embodiments, wherein the bacterium is formulated to be administered locally.

27. The bacterium of any one of the preceding embodiments, wherein the bacterium, when administered locally at an injection site, survives in the injection site for up to 5 days but dies within 48 hours outside the injection site.

28. The bacterium of embodiment 24, wherein the bacterium is administered with an equivalent dose of $7.5 \times 10^9$ cfu/kg mouse.

29. The bacterium of any one of the preceding embodiments, wherein the disease is a cancer or tumor and the bacterium is administered intratumourally.

30. The bacterium of embodiment 29, wherein the bacterium is administered with an equivalent dose of at least $5 \times 10^8$ cfu per gram tumor of about 100-200 mm$^3$.

31. A live bacterium of *Escherichia coli* sp., comprising a gene deletion of aspartate-semialdehyde dehydrogenase (asd) from a chromosome of the bacterium;
wherein the bacterium is derived from a virulent strain.

32. The bacterium of embodiment 31, wherein the bacterium expresses at least one effector gene that encodes a medical effector.

33. The bacterium of embodiment 31, wherein the bacterium is derived from a strain SH3 deposited at the China General Microbiological Culture Collection Center (CGMCC) under deposit no. 19836.

34. The bacterium of embodiment 31, wherein the bacterium further comprising a gene that encodes an exolysin A of *Pseudomonas aeruginosa* (ExlA).

35. The bacterium of embodiment 34, wherein the gene has at least about 80, 85, 90, 95 or 100% sequence identity to all or a fragment of SEQ ID NO: 35.

36. The bacterium of embodiment 31, wherein the bacterium is derived from a strain mp107 deposited at the China General Microbiological Culture Collection Center (CGMCC) under deposit no. 19835.

37. An immunogenic composition, comprising the bacterium of any one of the preceding embodiments.

38. A live bacterium vaccine, comprising the bacterium of any one of the preceding embodiments and, optionally, an adjuvant.

39. A method of treating a disease or condition, comprising administering to a subject a composition comprising an effective amount of the bacterium of any of the preceding embodiments.

40. The method of embodiment 39, wherein the disease is a tumor or a cancer.

41. A method of constructing a genetically engineered live bacterium, comprising the steps of:
genetically engineering a bacterium such that the bacterium has a short lifespan such that the bacterium, after being administered to a subject, survives within a time sufficient to allow the medical effector to exert at least one medical action and dies within a time sufficient to minimize pathogenesis to the subject, wherein the bacterium is derived from a virulent strain.

42. The method of embodiment 41, further comprising a step of:
genetically engineering the bacterium to express at least one medical effector.

Numbered Embodiments—Set 2

1. A genetically engineered live bacterium comprising
at least one effector gene that encodes at least one medical effector; and
at least one gene modification that shortens the bacterium's lifespan such that the live bacterium, after being administered to a subject, survives within a time that is sufficiently long to allow the medical effector to exert at least one medical action and dies after the time to minimize pathogenesis to the subject;
wherein the bacterium is derived from a virulent strain.

2. The bacterium of embodiment 1, wherein the medical effector is an antigen that can elicit at least one immune response in the subject sufficient to treat a target disease or condition.

3. The bacterium of embodiment 1, wherein the medical effector is a therapeutic factor that can elicit at least one immune response in the subject and/or reduce the size of a target lesion sufficient to treat a target disease or condition.

4. The bacterium of embodiments 2 or 3, wherein the immune response is elicited by CD4+ and/or CD8+ T cells.

5. The bacterium of embodiment 1, wherein the medical effector is an antigen or a therapeutic factor expressed from a homologous gene of the bacterium.

6. The bacterium of embodiment 1, wherein the medical effector is an antigen or a therapeutic factor expressed from a heterologous gene.

7. The bacterium of embodiment 6, wherein the heterologous gene further includes a leader sequence and/or a termination region that improve heterologous expression in the bacterium.

8. The bacterium of embodiments 3 or 6, wherein the therapeutic factor is a cytotoxin that causes cell lysis in the target lesion.

9. The bacterium of embodiments 2 or 3, wherein the target disease or condition is cancer or a tumor and wherein the medical effector causes tumor repression in the subject.

10. The bacterium of embodiment 1, wherein the bacterium is incapable of replicating or colonizing within the subject.

11. The bacterium of embodiment 1, wherein the gene modification is a deletion or a mutation of at least one essential or auxotrophic gene from a chromosome of the bacterium.

12. The bacterium of any one of the preceding embodiments, wherein the bacterium is an auxotroph in diaminopimelic acid.

13. The bacterium of any one of the preceding embodiments, wherein the gene modification is a deletion of aspartate-semialdehyde dehydrogenase (asd) from a chromosome of the bacterium.

14. The bacterium of any one of the preceding embodiments, wherein the bacterium has a survival time controllable by exposure of the bacterium to one or more modulating effectors that modulate the survival time of the bacterium when administered in vivo.

15. The bacterium of embodiment 14, wherein the modulating effector is diaminopimelic acid.

16. The bacterium of any one of the preceding embodiments, wherein the medical effector is a homologous peptide expressed by a gene selected from the group consisting of chuA, yjaA, tspE4C2, sat, sfa, papG, fyuA, iutA, hlyCABD, yfcV and pks island.

17. The bacterium of any one of the preceding embodiments, wherein the medical effector is a cytotoxin selected from the group consisting of exolysin A of *Pseudomonas aeruginosa* (ExlA), non-hemolytic enterotoxin (Nhe) of *Bacillus cereus*, hemolysins, and vacuolating toxin of *Helicobacter pylori* and combinations thereof.

18. The bacterium of any one of the preceding embodiments, wherein the medical effector is an anticancer factor selected from the group consisting of CpG, cyclic dinucleotide and tumor antigens.

19. The bacterium of any one of the preceding embodiments, wherein the bacterium is derived from *Escherichia, Salmonella, Shigella, Listeria, Bacteroides, Bifidobacterium, Clostridium, Lactobacillus* or *Lactococcus*.

20. The bacterium of any one of the preceding embodiments, wherein the bacterium is derived from *Escherichia coli*.

21. The bacterium of any one of the preceding embodiments, wherein the bacterium is derived from a strain SH3 deposited at the China General Microbiological Culture Collection Center (CGMCC) under deposit no. 19836.

22. The bacterium of any one of the preceding embodiments, wherein the bacterium expresses a sequence having at least about 80, 85, 90, 95 or 100% sequence identity to all or a fragment of SEQ ID No: 35.

23. The bacterium of any one of the preceding embodiments, wherein the bacterium is derived from a strain mp107 deposited at the China General Microbiological Culture Collection Center (CGMCC) under deposit no. 19835.

24. The bacterium of any one of the preceding embodiments, wherein the bacterium is formulated to be administered intravenously.

25. The bacterium of any one of the preceding embodiments, wherein, when administered intravenously, the time sufficient to minimize pathogenesis is less than 2 days, 5 days or 11 days.

26. The bacterium of any one of the preceding embodiments, wherein the bacterium is formulated to be administered locally.

27. The bacterium of any one of the preceding embodiments, wherein the bacterium, when administered locally at an injection site, survives in the injection site for up to 5 days but dies within 48 hours outside the injection site.

28. The bacterium of embodiment 24, wherein the bacterium is administered with an equivalent dose of $7.5 \times 10^9$ cfu/kg mouse.

29. The bacterium of any one of the preceding embodiments, wherein the disease is a cancer or tumor and the bacterium is administered intratumourally.

30. The bacterium of embodiment 29, wherein the bacterium is administered with an equivalent dose of at least $5 \times 10^8$ cfu per gram tumor of about 100-200 mm$^3$.

31. The bacterium of any one of embodiments 1-20, wherein the at least one effector gene comprises a cytotoxin gene and a partial DNA fragment of the hemolysin III-encoding gene.

32. The bacterium of embodiment 31, wherein the cytotoxin is exolysin A of *Pseudomonas aeruginosa* (ExlA).

33. The bacterium of any one of the embodiments 31 or 32, wherein the bacterium is derived from a strain mp106 deposited at the China General Microbiological Culture Collection Center (CGMCC) under deposit no. 22556.

34. The bacterium of any one of the preceding embodiments, further comprising at least one virulence gene modification that attenuates the virulence of the bacterium.

35. The bacterium of embodiment 34, wherein the at least one virulence gene modification is a deletion or a mutation of at least one virulence gene from a chromosome of the bacterium.

36. The bacterium of any one of the embodiments 34 or 35, wherein the virulence gene modification is a deletion of a hlyCABD operon from a chromosome of the bacterium.

37. The bacterium of any one of the embodiments 36, wherein the bacterium is derived from a strain SH4 deposited at the China General Microbiological Culture Collection Center (CGMCC) under deposit no. 22557.

38. The bacterium of any one of the embodiments 34-37, wherein the bacterium expresses a sequence having at least about 80, 85, 90, 95 or 100% sequence identity to all or a fragment of SEQ ID No: 40.

39. The bacterium of any one of the embodiments 34-37, wherein the bacterium expresses a first sequence having at least about 80, 85, 90, 95 or 100% sequence identity to all or a fragment of SEQ ID No: 41 and/or a second sequence having at least about 80, 85, 90, 95 or 100% sequence identity to all or a fragment of SEQ ID No: 42.

40. The bacterium of any one of the embodiments 38 or 39, wherein the bacterium is derived from a strain mp105 deposited at the China General Microbiological Culture Collection Center (CGMCC) under deposit no. 22555.

41. The bacterium of any one of embodiments 31-40, wherein the bacterium is administered with an equivalent dose of $2 \times 10^8$ cfu/mouse.

42. The bacterium of any one of the embodiments 34-40, wherein the bacterium is formulated to be administered in combination of intravenous injection and intratumoral injection.

43. The bacterium of embodiment 42, wherein the intratumoral injection has an equivalent dose of $7.5 \times 10^7$ cfu/mouse and the intravenous injection has an equivalent dose of $3 \times 10^7$ cfu/mouse.

44. A live bacterium of *Escherichia coli* sp., comprising a gene deletion of aspartate-semialdehyde dehydrogenase (asd) from a chromosome of the bacterium; wherein the bacterium is derived from a virulent strain.

45. The bacterium of embodiment 44, wherein the bacterium expresses at least one effector gene that encodes a medical effector.

46. The bacterium of embodiment 44, wherein the bacterium is derived from a strain SH3 deposited at the China General Microbiological Culture Collection Center (CGMCC) under deposit no. 19836.

47. The bacterium of embodiment 44, wherein the bacterium further comprising a gene that encodes an exolysin A of *Pseudomonas aeruginosa* (ExlA).

48. The bacterium of embodiment 47, wherein the gene has at least about 80, 85, 90, 95 or 100% sequence identity to all or a fragment of SEQ ID NO: 35.

49. The bacterium of embodiment 44, wherein the bacterium is derived from a strain mp107 deposited at the China General Microbiological Culture Collection Center (CGMCC) under deposit no. 19835.

50. The bacterium of embodiment 44, wherein the at least one effector gene comprises a cytotoxin gene and a partial DNA fragment of the hemolysin III-encoding gene.

51. The bacterium of embodiment 50, wherein the cytotoxin is exolysin A of *Pseudomonas aeruginosa* (ExlA).

52. The bacterium of any one of the embodiments 50 or 51, wherein the bacterium is derived from a strain mp106 deposited at the China General Microbiological Culture Collection Center (CGMCC) under deposit no. 22556.

53. The bacterium of any one of the embodiments 44-52, further comprising at least one virulence gene modification that attenuates the virulence of the bacterium.

54. The bacterium of embodiment 53, wherein the at least one virulence gene modification is a deletion or a mutation of at least one virulence gene from a chromosome of the bacterium.

55. The bacterium of any one of the embodiments 53 or 54, wherein the virulence gene modification is a deletion of the hlyCABD operon from a chromosome of the bacterium.

56. The bacterium of embodiment 55, wherein the bacterium is derived from a strain SH4 deposited at the China General Microbiological Culture Collection Center (CGMCC) under deposit no. 22557.

57. The bacterium of any one of the embodiments 53-56, wherein the bacterium expresses a sequence having at least about 80, 85, 90, 95 or 100% sequence identity to all or a fragment of SEQ ID No: 40.

58. The bacterium of any one of the embodiments 53-56, wherein the bacterium expresses a first sequence having at least about 80, 85, 90, 95 or 100% sequence identity to all or a fragment of SEQ ID No: 41 and/or a second sequence having at least about 80, 85, 90, 95 or 100% sequence identity to all or a fragment of SEQ ID No: 42.

59. The bacterium of any one of the embodiments 57 or 58, wherein the bacterium is derived from a strain mp105 deposited at the China General Microbiological Culture Collection Center (CGMCC) under deposit no. 22555.

60. The bacterium of any one of the embodiments 50-59, wherein the bacterium is administered with an equivalent dose of $2 \times 10^8$ cfu/mouse.

61. The bacterium of any one of the embodiments 53-59, wherein the bacterium is formulated to be administered in combination of intravenous injection and intratumoral injection.

62. The bacterium of embodiment 61, wherein the intratumoral injection has an equivalent dose of $7.5 \times 10^7$ cfu/mouse and the intravenous injection has an equivalent dose of $3 \times 10^7$ cfu/mouse.

63. An immunogenic composition, comprising the bacterium of any one of the preceding embodiments.

64. A live bacterium vaccine, comprising the bacterium of any one of the preceding embodiments and, optionally, an adjuvant.

65. A method of treating a disease or condition, comprising administering to a subject a composition comprising an effective amount of the bacterium of any of the preceding embodiments.

66. The method of embodiment 65, wherein the disease is a tumor or a cancer.

67. A method of constructing a genetically engineered live bacterium, comprising the steps of:
genetically engineering a bacterium such that the bacterium has a short lifespan such that the bacterium, after being administered to a subject, survives within a time sufficient to allow the medical effector to exert at least one medical action and dies within a time sufficient to minimize pathogenesis to the subject, wherein the bacterium is derived from a virulent strain.

68. The method of embodiment 67, further comprising a step of:
genetically engineering the bacterium to express at least one medical effector.

69. Use of a composition comprising an effective amount of the bacterium of any of the preceding embodiments in the manufacture of a medicament for treating a disease or condition.

70. The use of embodiment 69, wherein the disease is a tumor or a cancer.

In some embodiments, provided is a genetically engineered live bacterium comprising at least one effector gene that encodes a medical effector; and at least one gene modification that shortens the bacterium's lifespan such that the bacterium, after being administered to a subject, survives within a time sufficient to allow the medical effector to exert at least one medical action, and dies after the time to minimize pathogenesis to the subject. The bacterium is derived from a virulent strain.

In certain embodiments, the virulent strain may provide higher basal levels of immunogenicity and therapeutic potential than non-pathogenic or avirulent bacteria.

In certain embodiments, the time is sufficient to allow the medical effector to exert at least one medical action against at least one disease or condition. The action may persist after the time, long after the bacterium dies and is cleared out of the body of the subject.

In some example embodiments, the medical action is a preventive and/or therapeutic action.

In some example embodiments, the time sufficient for the bacterium's medical effector to initiate a preventive and/or therapeutic action is less than 48 hours.

Example 1

Materials and Methods (1) Methods of Constructing Short-Lived Bacteria Deletion or Mutation of Essential or Auxotrophic Genes To create short-lived bacteria, at least one essential or auxotrophic genes may be deleted or mutated. In certain example embodiments, a virulent bacterial strain is used for mutation.

In this example embodiment, an *E. coli* strain SH2 was isolated and purified from a stool sample provided by a healthy volunteer. The stool sample was resuspended in PBS buffer and spread on LB agar supplemented with 1 mM isopropyl β-D-thiogalactoside (IPTG) and X-gal (0.06 mg/ml). *E. coli* formed blue colonies and were discriminated from other bacteria species. SH2 is one of the fecal *E. coli* isolates. The strain SH2 was deposited at the China General Microbiological Culture Collection Center (CGMCC) under deposit no. 22685 on 10 Jun. 2021.

In this example embodiment, the asd gene, which is an essential gene coding for aspartate-semialdehyde dehydrogenase, is deleted from the chromosome of the *Escherichia coli* strain SH2. The asd gene was deleted from the bacterial chromosome of *E. coli* using the lambda(λ)-Red recombination system. Two primers were used to create the deletion:

```
                                         (SEQ ID NO: 1)
asd-F (forward primer):
TCACTTGCGACTTTGGCTGCTTTTTGTATGGTGAAAGATGTGCCAAATA
GGCGTATCACGAGGC (SEQ ID NO: 2)
asd-R (reverse primer):
GCACTAGCAGGGGCGGCATCGCGCCCCAGATTTAATGAATAAAGATAG
TGAACCTCTTCGAGGGAC
```

A DNA fragment encompassing a loxP-cat-loxP chloramphenicol resistance cassette with homology (45 nt) to the regions immediately flanking the asd gene was amplified by polymerase chain reaction (PCR) using the chloramphenicol resistance gene (cat) as a template. Primers asd-F and asd-R were used for this PCR. The electrocompetent *E. coli* was transformed with plasmid pSim6 on which the expression of the λ recombination proteins is induced at 42° C. The above PCR fragment was introduced into *E. coli* harboring pSim6 by electroporation. After induction of λ-red, recombinant colonies were selected for chloramphenicol resistance after an overnight incubation at 37° C. The resistance colonies were isolated and verified by colony PCR with primers asd-F2 (forward) TAGGTTTCCGAGCGGATCCA (SEQ ID NO: 3) and Cm-R3 (reverse) CCTCTTACGTGCCGAT-CAACG (SEQ ID NO: 4), which were designed to flank the asd gene. The size of the verification PCR is 505 bp. The asd deletion was further confirmed by phenotypic testing in which the correct colonies did not grow on LB medium but grew readily on LB medium supplemented with DAP (50 μg/ml). After the asd deletion was confirmed, a single colony was selected and transformed with a 705 Cre plasmid carrying the kanamycin-resistance gene. The expression of the Cre recombinase from the plasmid was induced at 37° C. and spread on Luria-Bertani (LB) agar without any antibiotics. Single colonies were then streaked on both LB agar and LB agar supplemented with chloramphenicol. A single colony that grew on LB agar but did not grow on LB agar with chloramphenicol were selected. This mutant strain with a gene deletion of asd but without the loxp-cat-loxp cassette is named SH3. The strain SH3 was deposited at the China General Microbiological Culture Collection Center (CGMCC) under deposit no. 19836 on 18 May 2020.

Virulence Gene Identification of Mutant Strain

Virulence genes within SH3 were detected by colony PCR. To design primers, conserved sequence regions were first identified across different *E. coli* strains by evaluation of multiple sequence alignments. Then, primers were designed to be specific to the conserved regions. All the primers used are listed in Table 1.

TABLE 1

Primers used for detecting virulence gene in SH3

| Primers | Sequence (5'-3') | SEQ ID NO. |
|---|---|---|
| hly operon-F | ACTCAGCAGGACAAAGCACG | SEQ ID No. 5 |
| hly operon-R | GAGGCCAATGAGTTTCTCTG | SEQ ID No. 6 |
| vat-F | GAACTAGCCCGAAGGGTATG | SEQ ID No. 7 |
| vat-R | TGGAGATCAGATGAACTGTGTTC | SEQ ID No. 8 |
| pks-left-F | AATCAACCCAGCTGCAAATC | SEQ ID No. 9 |
| pks-left-R | CACCCCCATCATTAAAAACG | SEQ ID No. 10 |
| pks-right-F | AGCCGTATCCTGCTCAAAAC | SEQ ID No. 11 |
| pks-right-R | TCGGTATGTCCGGTTAAAGC | SEQ ID No. 12 |
| papG-F | GCGCTAATAATCATTATGCGGC | SEQ ID No. 13 |
| papG-R | CAATATCATGAGCAGCGTTGC | SEQ ID No. 14 |
| sat-F | GGATAAGGACTTTAATCCGCTG | SEQ ID No. 15 |
| sat-R | TTGATCGCGTTATCCACGTTG | SEQ ID No. 16 |
| fyrA-F | TGACACGGCTTTATCCTCTG | SEQ ID No. 17 |
| fyrA-R | GTTGTTGGCTGATGCCGAG | SEQ ID No. 18 |
| iutA-F | AAGCTGGAAGGCGTGAAAGT | SEQ ID No. 19 |
| iutA-R | TAACCCGGGCTGTAGTACAG | SEQ ID No. 20 |
| yfcV-F | GAGTAAGTTTGCCAAAACAGCC | SEQ ID No. 21 |
| yfcV-R | CTGGAAATCTTTCGGTGTGGT | SEQ ID No. 22 |
| chuA-F | GACGAACCAACGGTCAGGAT | SEQ ID No. 23 |
| chuA-R | TGCCGCCAGTACCAAAGACA | SEQ ID No. 24 |
| yjaA-F | TGAAGTGTCAGGAGACGCTG | SEQ ID No. 25 |
| yjaA-R | ATGGAGAATGCGTTCCTCAAC | SEQ ID No. 26 |
| TspE4C2-F | GAGTAATGTCGGGGCATTCA | SEQ ID No. 27 |
| TspE4C2-R | CGCGCCAACAAAGTATTACG | SEQ ID No. 28 |
| sfa-F | CCCTCGTGGAGCCTTTTTTATAT | SEQ ID No. 29 |
| sfa-R | CACTGTTAACCTCTTCTGGTC | SEQ ID No. 30 |
| iutA-F | AAGCTGGAAGGCGTGAAAGT | SEQ ID No. 31 |
| iutA-R | TAACCCGGGCTGTAGTACAG | SEQ ID No. 32 |

In Vitro Bacterial Growth Assay

10 μl of overnight culture of bacteria SH3 was subcultured in 1 ml of LB broth medium with or without 50 μg/ml DAP (Time 0). After 24 and 48 hours of the incubation, the bacteria were serially diluted and viable bacteria were quantified by counting colony forming unit on both Luria-Bertani (LB) agar and LB agar supplemented with 50 μg/ml DAP.

Ex Vivo Bacterial Survival Assay

Six- to eight-week-old female C57BL/6J mice were euthanized. Organs including the liver, lung, heart, kidney and spleen were removed and individually homogenized. An equal volume of each of the individual organ suspensions were mixed together to form a mixed organ suspension. The suspension mixture was used for the ex vivo survival assay. 5 μl of overnight culture of bacteria was sub-cultured in 500 μl of the organ suspensions (time 0). Viable bacteria were quantified after 24 and 48 hours by counting colony forming unit on LB agar supplemented with 50 μg/ml DAP.

In Vivo Bacterial Survival Assay

Bacterial suspension (about $1 \times 10^9$ cfu) with or without 5 μg/ml DAP were injected subcutaneously into the flank of six- to eight-week-old female C57BL/6J mice (average body weight is around 20 g). Tissues from bacterial injection sites as well as key organs including the liver, lung, heart, kidney and spleen were then removed for determination of colony forming unit at different time points. About 1 gram of each tissue was homogenized in 1 ml of PBS buffer. The resulting tissue suspensions were serially diluted, plated on LB agar supplemented with 50 μg/ml DAP and incubated at 37° C. overnight respectively. The colony forming units (cfu) of the diluted tissue suspensions were counted respectively and the number of bacteria in tissues was calculated according to dilution fold.

The same in vivo bacterial survival assay was repeated using the similar method as above with an injection of the bacterial suspension (about $5 \times 10^8$ cfu) into the tail vein of six- to eight-week-old female C57BL/6J mice (average body weight is around 20 g). Tissues from bacterial injection sites as well as key organs including the liver, lung, heart, kidney and spleen were then removed for determination of colony forming unit at different time points. About 1 gram of each tissue was homogenized in 1 ml of PBS buffer. The resulting tissue suspensions were serially diluted, plated on LB agar supplemented with 50 μg/ml DAP and incubated at 37° C. overnight respectively. The colony forming units (cfu) of the diluted tissue suspensions were counted respectively and the number of bacteria in tissues was calculated according to dilution fold.

Example 2

(2) The Short-Lived Bacteria Served as a Vector for Medical Effectors

Construction of Short-Lived Bacteria Expressing Cytotoxins by Gene Cloning

The exlA gene (Genbank: CP000744.1) encoding exolysin A of *Pseudomonas aeruginosa* PA7 (ExlA) (FIG. 4), with the promoter and terminator (SEQ ID No: 35) were synthesized and cloned in the pBAD-DEST49 plasmid (Invitrogen, US, cat. No. 12283-016) using CloneEZ seamless cloning technology (GenScript) according to manufacturer's instruction. The recombinant plasmid pExlA was verified by sequencing analysis. The recombinant plasmid pExlA was subsequently introduced into the asd-deleted mutant SH3 by electroporation and verified by colony PCR using primers oxb-F (forward: CTGTTGTGACCGCTTGCTCT) (SEQ ID No: 33) and exlA-R (reverse: GAGGTGGAAGACAGGATTGTC) (SEQ ID No: 34). After the transformation of the plasmid was confirmed, a single colony was selected. The resulting mutant strain with recombinant plasmid is named mp107. The strain mp107 was deposited at the China General Microbiological Culture Collection Center (CGMCC) under deposit no. 19835 on 18 May 2020.

In Vitro Cytotoxicity Assay

Murine Lewis lung cancer (LLC) cell line and human lung cancer cell line (A549) were used for the in vitro cytotoxicity assay. Each cell line was seeded in 96-well plates at $1 \times 10^4$ cells per well in growth medium (DMEM+10% FBS+1% Gln+1% P/S). When the cells grew to 80% confluency, they were co-cultured with the bacteria mp107 at a moi of 100 (i.e. 100 bacteria per cell) in antibiotic-free medium plus 5 μg/ml DAP. An *E. coli* reference strain MG1655 was used as control bacteria. As controls, the control bacteria were also co-cultured with the 1× phosphate buffered saline (PBS) buffer. After 3 hours of incubation, the bacterial cells were washed thrice with PBS and stained with 1% crystal violet for 5 min. Cells stained with crystal violet will be regarded as viable cells, as the dead cells have been removed by the washings. The stained cells were gently washed with PBS and then destained with 95% ethanol. The amount of the crystal violet stain (Optical Density (OD) at 595 nm), which reflects the quantity of viable cancer cells, in the destaining solution was measured with a microtiter plate reader at 595 nm. Percentage of cells killed (or the killing percentage (%)) by the co-cultured bacteria was calculated using the following formula: $(OD_{595}$ of control$-OD_{595}$ of treat$)/OD_{595}$ of control$)\times 100\%$.

In Vivo Antitumor Assessment of the Short-Lived Bacteria when Administered Locally Six- to eight-week-old female C57BL/6J mice were used for tumor implantation of murine Lewis lung cancer cell line (LLC). Specifically, $1 \times 10^6$ cells of the cancer cell line were injected subcutaneously into the flank of each mouse. 7-12 days after the cell line implantation when the average volume of tumors reached about 100-200 mm³, control bacteria MG1655, short-lived bacteria SH3 and mp107 were injected into each tumor of each mouse at a dose of $5 \times 10^8$ cfu per gram of tumor, respectively. A negative control is prepared with injecting PBS and a high dose mp107 group is prepared with injecting $4 \times 10^9$ cfu per gram of tumor. Tumor size was measured using digital calipers around twice every week (from day 0 to day 20) after the bacterial i.t. injection. The difference of Tumor Growth Inhibition rate (TGI) between each of the treatment group and the controls was evaluated.

The short-lived bacteria SH3 and mp107 supplemented with 5 μg/ml of DAP were used to evaluate the modulation of the survival time of the short-lived bacteria by a medical effector in vivo.

In Vivo Antitumor Assessment of the Short-Lived Bacteria when Administered Systematically Six- to eight-week-old female C57BL/6J mice were used for tumor implantation of murine Lewis lung cancer cell line (LLC). Specifically, $1 \times 10^6$ cells of the cancer cell line were injected subcutaneously into the flank of each mouse. 7-12 days after the cell line implantation when the average volume of tumors reached about 100-200 mm³, short-lived bacteria mp107 were injected systematically by injecting into the tail vein of each mouse, respectively, at a dose of $7.5 \times 10^9$ cfu/kg mouse. A negative control is prepared with injecting PBS. Tumor size was measured using digital calipers around twice every week (from day 0 to day 20) after the bacterial i.v. injection. The difference of Tumor Growth Inhibition rate (TGI) between each of the treatment group and the controls was evaluated.

Biodistribution of the Short-Lived Bacteria in Mice

Mice after in vivo antitumor assessment were euthanized. Tumor tissue and tissues from key organs including the liver, lung, heart, kidney and spleen were then removed for determination of colony forming unit at different time points. About 1 gram of each tissue was homogenized in 1 ml of PBS buffer. The resulting tissue suspensions were serially diluted, plated on LB agar supplemented with 50 µg/ml DAP and incubated at 37° C. overnight respectively. The colony forming units (cfu) of the diluted tissue suspensions were counted respectively and the number of bacteria in tissues was calculated according to dilution fold.

Flow Cytometry

Tumor tissues were digested with 37.5 µg/mL Liberase™ (Roche) and 8,000 U/mL DNase I, bovine pancreas (Merck Millipore). The cell suspension was filtrated with a 200 µM cell strainer and rinsed with PBS. Cells were then stained for markers with the following antibodies: BB700 Rat Anti-Mouse CD4 Clone RM4-5 (RUO) (BD), Ms CD3e FITC 145-2C11 (BD), Ms CD4 BV510 RM4-5 (BD), Ms CD8a APC-Cy7 53-6.7 (BD), and BV510 Rat Anti-Mouse CD45RB (BD). The stained cells were analyzed with a flow cytometer Life Attune NxT (Life Technologies), according to manufacturer's instructions.

Results

Example 3

Construction of Short-Lived Bacteria

The mutant strain with gene deletion from the chromosome was prepared according to the method described in EXAMPLE 1 and named SH3. There are four phylogenetic groups (A, B1, B2 and D) of E. coli strains and, the phylogenetic types can be determined by PCR detection of the chuA and yjaA genes and DNA fragment TSPE4.C2 in the chromosome of E. coli. The primer pairs used are chuA-F (GACGAACCAACGGTCAGGAT) (SEQ ID No: 23) and chuA-R (TGCCGCCAGTACCAAAGACA) (SEQ ID No: 24), yjaA-F (TGAAGTGTCAGGAGACGCTG) (SEQ ID No: 25) and yjaA-R (ATGGAGAATGCGTTCCT-CAAC) (SEQ ID No: 26), and TspE4C2-F (GAGTAATGTCGGGGCATTCA) (SEQ ID No: 27) and TspE4C2-R (CGCGCCAACAAAGTATTACG) (SEQ ID No: 28). The size of the resulting PCR product was 279-, 211-, and 152-bp, respectively. An E. coli strain is determined as phylogenetic B2 group if it is positive with both chuA and yjaA. The phylogenetic typing showed that SH3 belongs to phylogenetic type B2 E. coli. Further PCR detection of E. coli virulence genes revealed that SH3 is positive with the polyketide synthase genomic island (pks island), which is a pathogenic island encoding giant modular nonribosomal peptide and polyketide synthases, and other virulence genes or operons such as chuA, yjaA, tspE4C2, sat, sfa, papG, fyuA, iutA, hlyCABD, and yfcV. Results showed that SH3 is an E. coli strain having multiple virulent factors, thereby providing higher basal levels of immunogenicity and therapeutic efficacy than those engineered from non-pathogenic or avirulent strains.

Results of In Vitro Bacterial Growth Assay of the Short-Lived Bacteria

Now referring to FIGS. 1A and 1B, the in vitro growth assays showed that the asd-deleted mutant SH3 failed to live in the growth medium (LB) without supplementing DAP (FIG. 1A) but grew readily (about $8 \times 10^7$ cfu after 24 hours and about $5 \times 10^7$ cfu after 48 hours) when DAP was supplemented in the growth medium (FIG. 1B). These results indicate that the genetically modified short-lived bacteria with an essential gene deletion cannot survive in vitro in the absence of essential supplement.

Results of Ex Vivo Bacterial Survival Assay of the Short-Lived Bacteria

Now referring to FIG. 1C, poor survival (no growth after 24 or 48 hours) of the asd mutant SH3 was also observed in ex vivo studies in which the asd mutant SH3 was incubated in homogenized, mixed organ suspension and then the viable bacteria were quantified by counting colony forming units on LB agar supplemented with DAP (50 µg/ml) (FIG. 1C). The results indicate that the genetically modified short-lived bacteria with an essential gene deletion cannot survive ex vivo in the absence of essential supplement.

Results of In Vivo Bacterial Survival Assay of the Short-Lived Bacteria

To determine if the asd mutant SH3 could survive in vivo for a short period of time, the asd mutant SH3 (about $1 \times 10^9$ cfu) was subcutaneously injected in mice.

Now referring to FIG. 1D, without DAP supplementation, after 2 days from injection, the viable count of SH3 dropped from about $1 \times 10^9$ cfu to about $2.7 \times 10^8$, with about 27% of SH3 remaining alive in the injection site. The viable count continued to drop dramatically after 5 days. No viable count can be detected after 11 days, indicating that genetically modified bacteria with an essential gene deletion are short-lived and cannot replicate or colonize in vivo.

Results of In Vivo Bacterial Survival Assay of the Short-Lived Bacteria

In vivo bacterial survival assay results also showed that SH3 was only present in the subcutaneous injection site and can survive up to 5 days, but absent in all other organs tested (including the liver, lung, spleen, heart and kidney), regardless of the supplementation or absence of DAP in the bacteria suspension, after 2 days, 5 days and 11 days from the injection.

The results indicate that the short-lived bacteria are localized within the subcutaneous injection site, thereby being safe for use when administered locally.

The short-lived bacterium SH3 (about $5 \times 10^8$ cfu) was further injected into the tail vein of six- to eight-week-old female C57BL/6J mice to further evaluate their safety when administered systematically. No mice treated with the short-lived bacteria died after the intravenous injection. By contrast, 100% of the mice treated with the wild-type bacteria died within 48 hours. Moreover, SH3 was not detected in any of the organs of any of the mice treated with the short-lived bacteria, when examined 6 days after the intravenous (i.v.) injection.

Notably, in all these in vivo assessments, the mutation rate of the asd-deleted mutant SH3 is 0%. That is, 100% of the cells of SH3 isolated from the injection site kept their dependence on DAP for survival and growth, indicating that even the genetically modified bacteria retain their virulent factors, the bacteria are safe for use no matter the bacteria are administered locally or systematically.

In summary, these data indicate that the short-lived bacteria possessing virulence factors are surprisingly safe for use in vivo when they are administered locally or systematically. Without being bound to any theory, the short-lived bacteria survive temporarily within the subject or host such that no systemic infection or disease could be developed even though the bacteria have multiple virulence factors. Therefore, the bacteria can be used as a safe but high-efficacy vector or vehicle for making vaccines or therapeutic agents to treat or prevent various diseases or improving certain conditions. Short-lived mutant bacteria such as SH3 can be used as a platform to develop live therapeutics.

Modulation of Survival Time of the Short-Lived Bacteria

Still referring to FIG. 1D, the bacteria suspension was supplemented with DAP at a final concentration of 5 µg/ml and an in vivo bacterial survival assay was performed. With DAP supplementation, after 2 days from injection, the viable count of SH3 only drops from about $1\times10^9$ cfu to about $6.27\times10^8$ cfu. In other words, about 62.7% of the asd mutant SH3 survived in the injection site for 2 days after the injection (FIG. 1D). This percentage is significantly higher than that of SH3 without DAP. Therefore, the results indicated that the survival time of the short-lived bacteria can be modulated by supplementing a modulating effector. It is advantageous that the survival time of the mutant short-lived bacteria is controllable by a modulating effector. Although the survival time of SH3 in the injection site was increased due to the addition of 5 µg/ml DAP, SH3 was absent in any key organs of any mice when examined after 2 days, 5 days and 11 days from the injection.

Example 4

Results of Construction of Short-Lived Bacteria Expressing Heterologous Virulent Factors In this example embodiments, the short-lived bacteria SH3 obtained from EXAMPLE 2 was further transformed with a plasmid expressing a cytotoxin, exolysin A of *Pseudomonas aeruginosa* (ExlA), under the control of a constitutive promoter oxb18. The sequences include the oxb 18 promoter, the pelB leader sequence, the exlA gene of *Pseudomonas aeruginosa* PA7, and the terminator (rrnB transcription termination region) were shown as SEQ ID NO: 35, and cloned into the plasmid pBAD-DEST49 to form a recombinant plasmid pExlA (FIG. 4). The purified and verified recombinant strain was named as mp107.

Results of In Vitro Cytotoxicity Assay of the Short-Lived Bacteria Expressing Cytotoxin Now referring to FIG. 2A, the cytotoxicity of mp107 was evaluated in vitro. The killing percentage was determined after the cell line was co-cultured with the bacteria for 3 hours in growth medium plus DAP (5 µg/ml). Both P<0.001 (Independent t test). The data showed that the short-lived bacteria mp107 has a surprisingly high killing percentage to the LLC cells of about 92% whilst the control bacteria MG1655 has a killing percentage of only about 13% (FIG. 2A). The data also showed that mp107 has a surprisingly high killing percentage to the A549 cells of about 90% whilst the control bacteria MG1655 has a killing percentage of only about 30% (FIG. 2B). These results showed that mp107 is toxic or lethal to murine and human lung cancer cells, indicating that the short-lived bacteria expressing heterologous virulence factors such as cytotoxins may have high efficacy to treat cancers such as lung cancer.

Results of In Vivo Antitumor Assessment of the Short-Lived Bacteria when Administered Locally Now referring to FIG. 2B, a syngeneic murine cancer model in which mice carried subcutaneous tumors formed by Lewis lung cancer cell (LLC) was constructed. To improve survival time of the short-lived bacteria within the tumors in vivo, the in vivo antitumor assessment was performed with the bacterial suspension supplemented with DAP at a dose of 5 µg/ml prior to administration to the tumor in the mice. With the groups of control strain MG1655, short-lived bacteria SH3 and short-lived bacteria expressing exolysin of exlA mp107, these bacteria were injected at a dose of $5\times10^8$ cfu per gram of tumor; with the group of mp107 (high dose), the injection dose was $4\times10^9$ cfu per gram of tumor. FIG. 2B shows that tumor growth of SH3 group was significantly repressed when compared to the controls MG 1655 group and PBS group (no bacterial injection) throughout the treatment period (from day 3 to day 20). The short-lived bacteria SH3 displayed higher levels of tumor repression than the reference strain MG1655 (p=0.0002), indicating that SH3 bacteria having virulence factors have a higher anticancer efficacy than the control bacteria. The data also showed the tumor growth of mp107 group was significantly repressed when compared to the SH3 group throughout the treatment period (from day 3 to day 20). Data further showed that short-lived bacteria expressing a further cytotoxin, mp107, repressed tumor growth more efficiently than the short-lived bacteria, SH3, per se (p=0.03), demonstrating that the exlA-encoded cytotoxin confers additional anticancer capacity to the short-lived bacteria. When the injection dose was increased to $4\times10^9$ cfu (higher dose) per gram of tumor, the anticancer efficacy of mp107 was increased accordingly. Compete response rate of mp107 at the high dose reached 75% (6 out of 8 mice) 20 days after the intratumoral injection of the bacteria, indicating the additive or even synergistic effect of the short-lived bacteria SH3 further expressing heterologous virulence factors such as cytotoxins ExlA (i.e., the treatment group of mp107) in anticancer efficacy. Comparison of tumor growth inhibition rate (TGI) showed significant difference between each of the treatment groups and the control group.

Results of In Vivo Antitumor Assessment of the Short-Lived Bacteria when Administered Systematically Now referring to FIG. 3A, the short-lived bacteria mp107 were injected into the tail vein of mice ($7.5\times10^9$ cfu/kg mouse) intravenously. Tumor growth was significantly repressed as the result of the intravenous injection of the short-lived bacteria compared to that of the PBS control group throughout the treatment time (from day 2-day 30). 44.4% (4 out of 9 mice) of the mp107-treated mice were cured of their tumors on day 30, indicating that the short-lived bacteria when administered systematically at a single dose of $7.5\times10^9$ cfu/kg mouse are effective in treating cancer.

Results of Biodistribution of the Short-Lived Bacteria in Mice

At the end of the experiments, the bacteria-treated mice were analyzed for the biodistribution of the bacteria. No short-lived bacteria mp107 were detected in either tumors or any key organs (including the lung, liver, spleen, heart, or kidney), indicating that the short-lived bacteria do not colonize in the tumor tissue or in the subject. As the tumors were free of the bacteria, the data indicated that the observed tumor repression following the intravenous injection of the short-lived bacteria was caused by an indirect mechanism, such as an immunological mechanism.

Results of Flow Cytometry

Now referring to FIGS. 3B and 3C, the intratumoral lymphocytes were analyzed by flow cytometry. Data showed that CD4+ T cells and CD8+ T cells increased by 19 and 12 folds, respectively, in tumors of the mice treated with the short-lived bacteria mp107 compared with those of the mice treated with the control bacteria MG1655, indicating that the short-lived bacteria elicit T cell response in the treated mice. These data demonstrate that the short-lived bacteria mp107 that express the heterogenous protein ExlA elicit anticancer immunity, thereby repressing the tumor growth.

These data indicate that the short-lived bacteria expressing certain antigens may also serve as vaccines against the development of diseases such as cancer.

Example 5

Materials and Methods (3) Methods of Constructing Short-Lived Bacteria Deletion or Mutation of Virulence Gene To further improve the safety of using the short-lived bacteria, the virulence of the short-lived bacteria may be further attenuated by additional genetic modifications. In this example embodiment, the hlyCABD operon coding for alpha hemolysin of a bacteria (*E. coli*) strain SH3 was deleted or mutated to generate a new bacterial strain SH4.

In this example embodiment, the hlyCABD operon was deleted from the bacterial chromosome of the *Escherichia coli* strain SH3 using the lambda(λ)-Red recombination system. Two primers were used to create the deletion:

```
M-hly-F (forward):
                                (SEQ ID No: 36)
TTGGTTTGCTTTTTTTTACCTGCCACCGCAATGAATGCTTTTTTTAATAG

GCGTATCACGAGGC

M-hly-R (reverse):
                                (SEQ ID No: 37)
TTAACGCTCATGTAAACTTTCTGTTACAGACTCTTCCAGAGGACTTAGTG

AACCTCTTCGAGGGAC
```

The M-hly-F and M-hly-R primers were used to amplify the chloramphenicol resistance cassette by PCR. A DNA fragment encompassing a loxP-cat-loxP chloramphenicol resistance cassette with homology (45 nt) to the regions immediately flanking the hlyCABD operon was amplified by PCR using the chloramphenicol resistance gene (cat) as a template. Primers M-hly-F and M-hly-R were used for this PCR. The bacterial strain SH3 was transformed with plasmid pSim6 on which the expression of the λ recombination proteins was induced at 42° C. The above PCR fragment was introduced into the SH3 harboring pSim6 by electroporation. After induction of λ-red, recombinants were selected for chloramphenicol resistance and verified by colony PCR. The chloramphenicol resistance cassette was then removed using the 705 Cre method according to the manufacture's instruction (Gene Bridges, Germany). Briefly, the expression of the Cre recombinase from the plasmid in the transformant was induced at 37° C. and then the bacteria were spread on LB agar without any antibiotics. After overnight culture at 37° C., single colonies were streaked on both LB agar and LB agar supplemented with chloramphenicol. A single colony that grew on LB agar but did not grow on LB agar with chloramphenicol were selected. This mutant strain with both the deletion of hlyCABD operon and the deletion of the asd gene but without the loxp-cat-loxp cassette is named SH4. The bacterial strain SH4 was deposited at the China General Microbiological Culture Collection Center (CGMCC) under deposit no. 22557 on 18 May 2021.

Example 6

Figure 5:
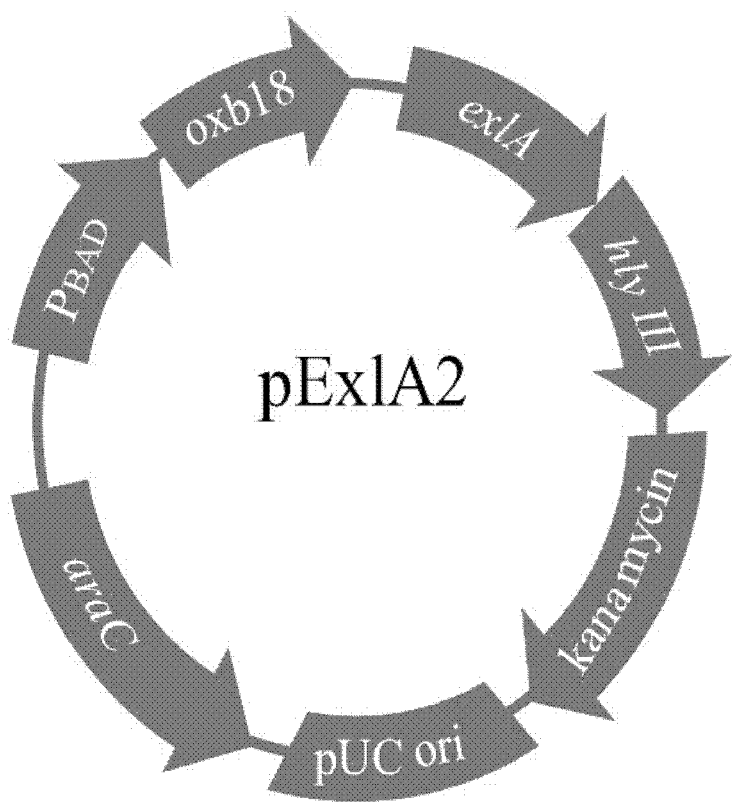
FIG. 5 shows a schematic diagram of map of the plasmid pExlA2, according to an example embodiment.

(4) The Short-Lived Bacteria Served as a Vector for Medical Effectors
Construction of Short-Lived Bacteria Expressing Cytotoxins and Hemolysin III Partial Fragment by Gene Cloning The exlA gene encoding exolysin A of *Pseudomonas aeruginosa* (SEQ ID NO: 41) and a partial DNA fragment of the hly III gene encoding hemolysin III (SEQ ID No: 42) were synthesized and cloned in a pBAD-DEST49 plasmid (Invitrogen, US, cat. No. 12283-016) to form a recombinant plasmid pExlA2 (FIG. 5) using CloneEZ seamless cloning technology (GenScript) according to manufacturer's instructions. The recombinant plasmid pExlA2 was verified by sequencing analysis. The recombinant plasmid pExlA2 was subsequently introduced into the bacterial strain SH4 and SH3, respectively, by electroporation and verified by colony PCR. After the transformation was confirmed, a single colony was selected for each bacterial strain. The resulting mutant strains SH4 and SH3 transformed with recombinant plasmid pExlA2 are named as mp105 and mp106, respectively. The strain mp105 was deposited at the China General Microbiological Culture Collection Center (CGMCC) under deposit no. 22555 on 18 May 2021. The strain mp106 was deposited at the China General Microbiological Culture Collection Center (CGMCC) under deposit no. 22556 on 18 May 2021.

Example 7

Hemolysis Assay

The recombinant plasmid pExlA2 was introduced into a control bacterial strain MG1655 by electroporation and verified by colony PCR. After the transformation was confirmed, a single colony was selected. The resulting MG1655 transformed with the plasmid pExlA2 was named MG1655/pExlA2.

Overnight cultures of bacterial strains SH3, SH4, the control bacterial strain MG1655 and MG1655/pExlA2 were dropped on LB agar supplemented with diaminopimelic acid (DAP, 50 μg/ml) and 10% (v/v) of rabbit blood, respectively, and then incubated at 37° C. for 8-10 hours. At the end point, the abilities of hemolysis of the corresponding bacterial strains were observed. Hemolysis as a result of breakdown of red blood cells was revealed by observation of the presence of clearing of the agar.

Example 8

In Vivo Assessment of Safety and Anticancer Efficacy after Injection with Short-Lived Bacteria Six- to eight-week-old female C57BL/6J mice were used for tumor implantation of murine Lewis lung cancer cell line (LLC). Specifically, $1 \times 10^6$ cells of the LLC cell line were injected subcutaneously into the flank of each mouse. 7-12 days after the cell line implantation when the average volume of tumors reached about 50-200 $mm^3$, bacterial strains (mp105, mp106 and/or mp107) were either intravenously injected (iv) into the tail vein or combination of intravenous injection and intratumoral injection (iv+it) of each mouse, respectively. The PBS buffer was injected in the same manner to serve as a negative control. Body weight was measured on day 4, day 6, day 8 and day 11 following the bacterial injection. Tumor size was measured using digital calipers 2-3 times every week following the bacterial injection.

Example 9

Species Identification

The bacteria to be identified were isolated from tissues and purified by subculturing. Genomic DNA was then isolated from each bacterial strain using Tiangen genomic DNA kit (Tiangen Biotech, Beijing) according to manufacturer's instructions and species identification was determined by 16S ribosomal DNA (rDNA) sequence analysis. Specifically, the genomic DNA was used as template to perform PCR amplification using primers 27F and 1492R. The PCR products were then sequenced and blasted in the GenBank.

```
                                           (SEQ ID No: 38)
27F (forward):
AGAGTTTGATCCTGGCTCAG (SEQ ID No: 39)
1492R (reverse):
TACGGCTACCTTGTACGACTT
```

Example 10

Assessment of Short-Lived Bacteria as Therapeutic and Preventive Vaccines

In this example, female C57BL/6J mice with exiting bacterial infections were used to demonstrate and evaluate the ability of mp105 in alleviating bacterial infections. The bacteria isolated from the organs including liver and lung of the mice were analyzed for species identification according to the method described in EXAMPLE 9. The 16S rDNA sequencing revealed that the mice had naturally been infected by Salmonella typhimurium. To examine if mp105 could treat the existing S. typhimurium infection and/or prevent subsequent bacterial infection, the mice were given two doses of subcutaneous injections of mp105 ($1 \times 10^8$ cfu/mouse) or PBS 14 days apart. 14 days after the injection, the mice were challenged with pathogenic E. coli strain CFT073 at a dose of $2 \times 10^7$ cfu/mouse to establish additional infection. 5 days after the challenge, the mice were euthanized and the key organs such as liver, lung, heart, kidney and spleen were analyzed for bacterial infection by plate counting the colony forming unit (CFU) and PCR verification of the colonies. As the S. typhimurium strain is negative for the hlyCABD operon while CFT073 carries the operon, PCR could be used to discriminate the two types of bacteria. The primers used for the PCR are hly-F and hly-R.

```
                                           (SEQ ID No: 5)
hly-F (forward):
ACTCAGCAGGACAAAGCACG (SEQ ID No: 6)
hly-R (reverse):
GAGGCCAATGAGTTTCTCTG
```

Results

Example 11

Results of Construction of Attenuated Short-Lived Bacteria

The mutant strain with gene deletion of the hlyCABD operon from the chromosome of SH3 was prepared according to the method described in EXAMPLE 5 and named as SH4. The deletion of the hlyCABD operon coding for alpha hemolysin can improve the safety of using SH4 as an example of short-lived bacteria for various applications such as cancer therapy and vaccines against microbial infections.

Example 12

Results of Construction of Attenuated Short-Lived Bacteria Expressing Cytotoxins The short-lived bacteria SH4 obtained from EXAMPLE 5 and SH3 obtained from EXAMPLE 2 were further transformed with a plasmid expressing a cytotoxin, exolysin A of Pseudomonas aeruginosa (SEQ ID NO: 41) and a partial DNA fragment of the hly III gene encoding hemolysin III (SEQ ID NO: 42) according to the method described in EXAMPLE 6, respectively. The sequences include the oxb 18 promoter, the pelB leader sequences, the exlA gene of Pseudomonas aeruginosa PA7, the partial DNA fragment of the hemolysin III-encoding gene, and the terminator (rrnB transcription termination region) were shown as SEQ ID NO: 40, and cloned into the plasmid pBAD-DEST49 to form a recombinant plasmid pExlA2. The resulting mutant strains SH4 and SH3 transformed with recombinant plasmid pExlA2 are named as mp105 and mp106, respectively.

Example 13

Results of Hemolysis Assay

Figure 6A:
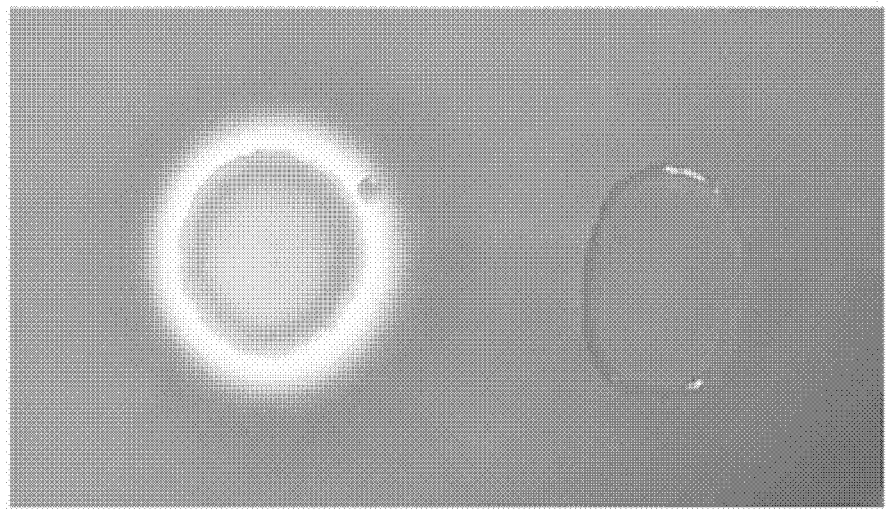
FIG. 6A shows a hemolysis analysis of *Escherichia coli* strains SH3 and SH4, according to an example embodiment.

Now referring to FIG. 6A, the results showed that after the deletion of the hlyCABD operon coding for alpha hemolysin from the genome of SH3, SH4 lost the ability to cause hemolysis, indicating that SH4 is deficient in the production of alpha hemolysin. By contrast, SH3 still maintains the ability to cause hemolysis.

Figure 6B:
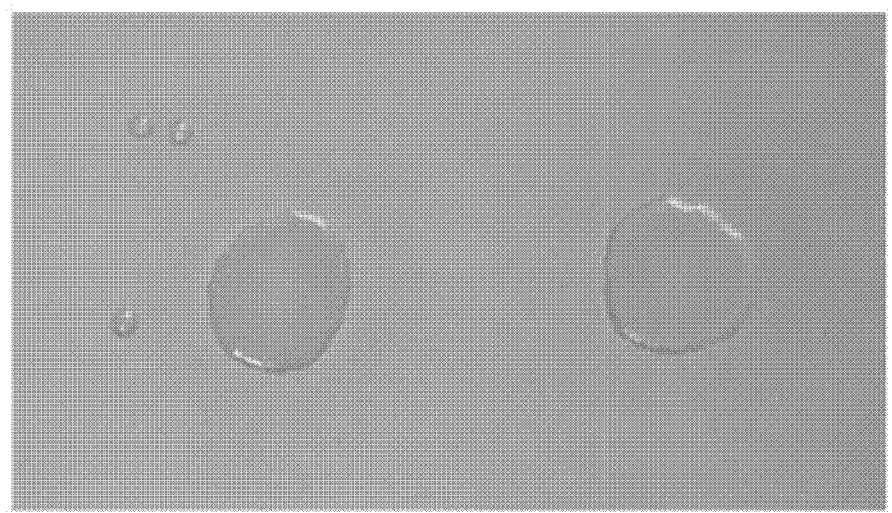
FIG. 6B shows a hemolysis analysis of *Escherichia coli* control strain MG1655 and MG1655/pExlA2, according to an example embodiment.

Now referring to FIG. 6B, the hemolysis assay results showed that both MG1655 and MG1655/pExlA2 did not cause hemolysis. The results indicate that no hemolysin III is produced from the plasmid despite of the presence of the partial DNA fragment of the hemolysin III-encoding gene. Surprisingly, the results of in vivo assessment of tumor therapy (as shown in details in EXAMPLE 15 below) suggested that the expression of this fragment enhances the anticancer efficacy.

Taken together, since mp105 was obtained from SH4 transformed with pExlA2, the example short-lived bacteria mp105 is also deficient in hemolysin production and is therefore speculated to be safer for use within a body of a subject for various applications such as cancer therapy.

Example 14

Figure 7:
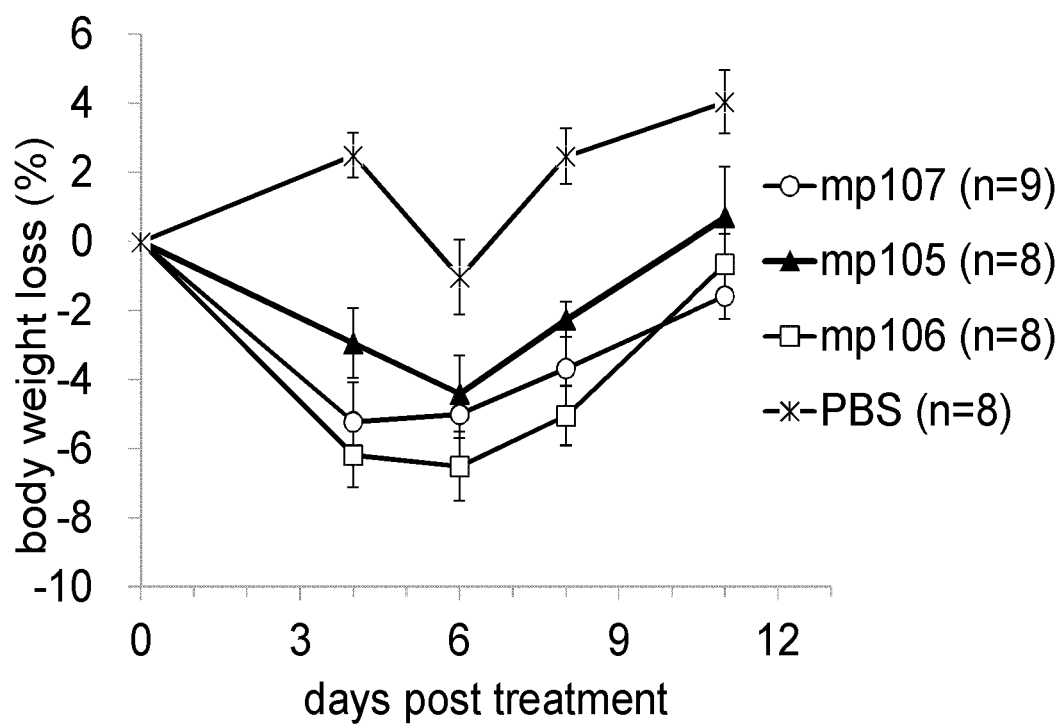
FIG. 7 shows the percentages of loss of body weight of mice after being intravenously injected with mp105, mp106 or mp107 at a dose of $2 \times 10^8$ cfu/mouse, according to an example embodiment. PBS served as negative control. Error bar, SEM.

Results of In Vivo Assessment of Safety and Anticancer Efficacy after Injection with Short-Lived Bacteria Now referring to FIG. 7, a syngeneic murine cancer model in which mice carried subcutaneous tumors formed by Lewis lung cancer cell (LLC) was established. The percentage change in loss of body weight of each mouse treated with bacteria mp105, mp106 and mp107, respectively, was shown according to the method described in EXAMPLE 8. Each bacterial strain was intravenously injected at a dose of $2 \times 10^8$ cfu/mouse. In general, although all the mice treated with bacteria lost certain body weight after the intravenous injection, mp105-treated mice lost significantly much less body weight than the mice treated with mp106 or mp107. In particular, difference in body weight loss reached statistically significant (independent t test, $P<0.05$) on day 4 and day 8 between the mp105- and mp106-treated mice. These results further indicate that the example short-lived bacteria mp105 has better anticancer efficacy and is safer for in vivo use within a body of a subject than mp106 or mp107, due to at least the deletion of the hlyCABD operon.

Example 15

Results of In Vivo Assessment of Tumor Therapy Mediated by Short-Lived Bacteria

Figure 8:
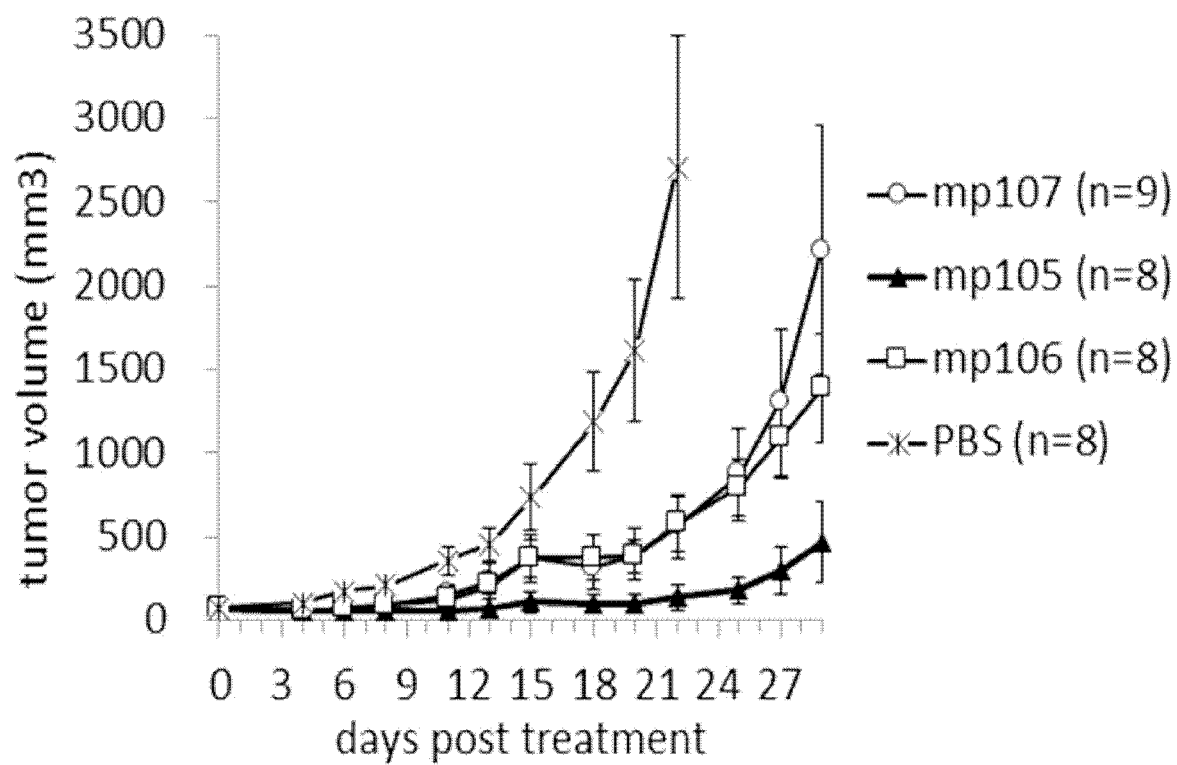
FIG. 8 shows the increase in tumor volume (mm3) of mice carrying subcutaneous LLC tumors intravenously injected with mp105, mp106 or mp107, according to an example embodiment. PBS served as negative control. Error bar, SEM.

Now referring to FIG. 8, the anticancer efficacy of mp105, mp106 and mp107 was compared according to the method described in EXAMPLE 8. The in vivo data showed that the growth of tumor volume of mp106 is significantly slower than that of mp107, especially after day 21 post treatment, indicating that mp106 displayed moderate improvement in anticancer efficacy compared with mp107. These results indicate that pExlA2 confer even better anticancer ability to bacteria than pExlA. Surprisingly, mp105 is significantly better than both mp106 (p=0.04) and mp107 (p=0.031) in inhibiting tumor growth. 37.5% of the mp105-treated mice was cured of the tumor by the end of the experiment. The cure rate in the mp106- and mp107-treated group was 12.5% and 11.1%, respectively, lower than that of mp-105-treated mice. These results collectively indicate that the example short-lived bacteria mp105 is not only safer but also even more effective against cancer compared with mp106 and mp107.

Example 16

Figure 9:
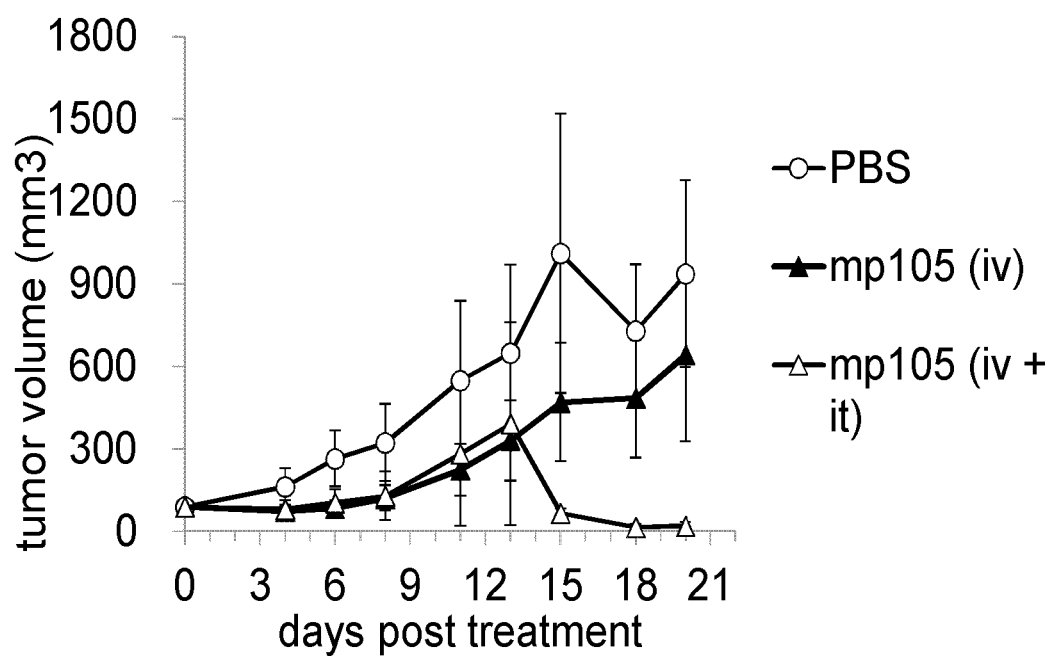
FIG. 9 shows the increase in tumor volume (mm3) of mice carrying subcutaneous LLC tumors administrated with intravenous injection of mp105 (iv) or combination of intravenous injection and intratumoral injection of mp105 (iv+it), according to an example embodiment. PBS served as negative control. Error bar, SEM.

Results of In Vivo Assessment of Anticancer Efficacy Mediated by Short-Lived Bacteria by Different Routes of Administration Now referring to FIG. 9, different routes of administration of mp105 were compared according to the method described in EXAMPLE 8. The combination of intratumoral and intravenous injection of mp105 in cancer therapy was compared with the intravenous injection alone. The doses of the intratumoral injection and intravenously injection were 7.5× $10^7$ cfu/mouse and 3×$10^7$ cfu/mouse, respectively. FIG. 9 showed that the mice carrying subcutaneous LLC tumors and given a combination of intravenous injection and intratumoral injection of mp105 (iv+it) has a surprisingly drop of tumor volume after day 12 post treatment, compared to those given intravenous injection of mp105 only (iv). The results indicate that combination of the two routes of administration (i.e., intravenous injection and intratumoral injection) remarkably improves the anticancer efficacy of the example short-lived bacteria mp105 in comparison with the intravenous injection alone. It indicates that, for clinical use, the example short-lived bacteria mp105 can be directly injected into a primary cancer lesion and meanwhile intravenously injected to control metastatic lesions.

Example 17

Figure 10B:
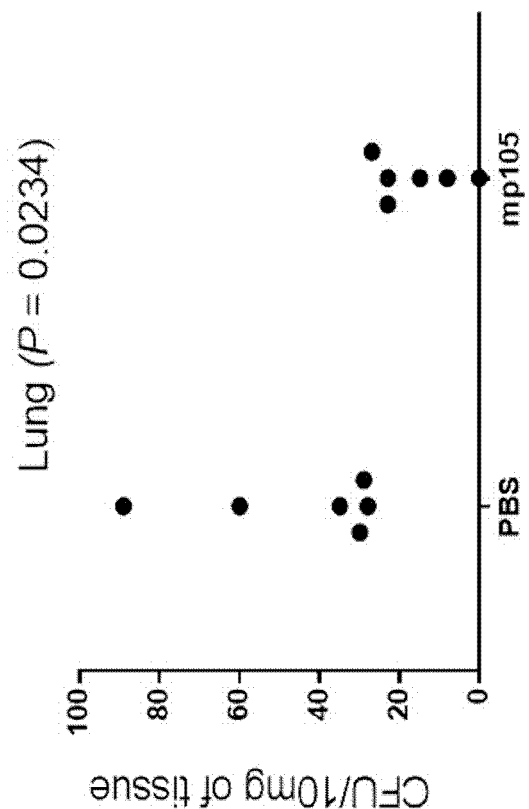
FIGS. 10A and 10B show the quantification of *Salmonella typhimurium* in the liver and lung, respectively, 14 days after two doses of subcutaneous injection of mp105 at a dose of $1 \times 10^8$ cfu/mouse or PBS, according to an example embodiment. The bacteria in the organs were quantified by counting the colony forming unit and verified by colony PCR.
Figure 10A:
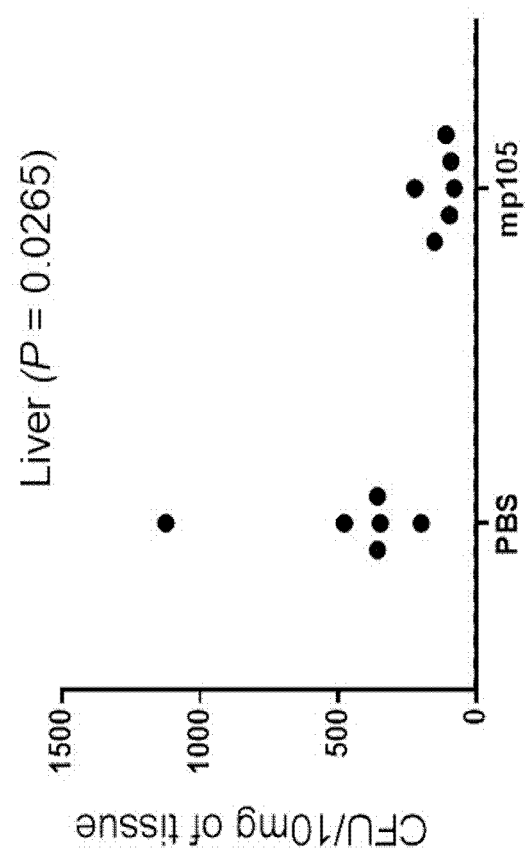

Results of Assessment of Short-Lived Bacteria as Therapeutic and Preventive Vaccines Now referring to FIGS. 10A and 10B, the ability of the example short-lived bacteria mp105 served as a vaccine against microbial infections was assessed. mp105, a short-lived bacterium genetically engineered from a type B2 *E. coli* with multiple virulence factors and antigens, has shown to be highly immunogenic in the previous examples. This, together with its heterogenous expression of exlA and has been further attenuated as the result of the hlyCABD deletion, making mp105 to be used as a safe live vaccine within a body of a subject. The results in FIGS. 10A and 10B indicate that the two doses of subcutaneous injection of mp105 significantly reduced *S. typhimurium* in the key organs tested including the liver and lung. In comparison with PBS, mp105 reduced the number of *S. typhimurium* by 73.6% in the liver (FIG. 10A) and by 64.6% in the lung (FIG. 10B). This indicates that the example short-lived bacteria mp105 acts as an effective therapeutic vaccine against existing bacterial infection. In addition, CFT073 was detected in the liver of one PBS-treated mouse (100 CFU/10 mg of liver tissue), in the heart of one PBS-treated mouse (3 CFU/10 mg of heart tissue) and in the lung of one PBS-treated mouse (15 CFU/10 mg of liver tissue). In other words, 50% of the PBS-treated mice was infected by CFT073. In contrast, CFT073 was not detected in any mice of the mp105-treated group (Chi-Square test, P=0.046). This indicates that the example short-lived bacteria mp105 also acts as a preventive vaccine against potential bacterial infections.

The exemplary embodiments of the present disclosure are thus fully described. Although the description referred to particular embodiments, it will be clear to one skilled in the art that the present invention may be practiced with variation of these specific details. Hence this disclosure should not be construed as limited to the embodiments set forth herein.

For example, it is clear that the medical effectors that are useful in treating a disease or a condition in a subject may be intrinsic effectors of the selected bacterial strain. These medical effectors may be overexpressed or repressed according to the specific design by genetic modifications. A heterologous expression of medical effectors derived from other strains or origins may also be used.

For example, the gene deletion of an essential gene aspartate-semialdehyde dehydrogenase (asd) from the chromosome is described as above, but other essential or auxotrophic genes may be deleted or mutated in order to produce a short-lived bacterium. These essential genes may be but not limited to asd, csrA, thyA, dapA, dapB, ribF, ispH, folA, ftsL, murE, mraY, lpxC, secA, can, heml, map, rpsB, and tsf. Appropriate primer sequences can be designed according to the relevant genes involved.

For example, the gene deletion from the chromosome as described above is done by the lambda(λ)-Red recombination system, but other genetic modification techniques known in the art such as restriction enzyme cloning may be used.

For example, the bacterial strain used as above is an *E. coli* strain, but other bacterial strains including Gram positive and Gram negative bacteria may be used. Examples includes but not limited to *Bacillus, Escherichia, Salmonella, Shigella, Listeria*. Other bacteria such as *Bacteroides, Bifidobacterium, Clostridium, Lactobacillus* and *Lactococcus* may also be used.

For example, the gene modification as described above is a gene deletion, but other gene modifications such as gene mutations may also be used. Two or more gene modifications may be introduced to create the short-lived bacteria.

For example, the modulating effector described above is DAP. However, other modulating effectors may be used according to the relevant gene modifications employed. In certain embodiments, the modulating effectors are nontoxic and safe for use in the subject.

For example, an example embodiment of expression of a cytotoxin ExlA is described as above, but other constructions of short-lived bacteria having heterologous expression of other proteins or cytotoxins having therapeutic effect may also be used. The other proteins may be anticancer effectors or their combinations useful for cancer therapy. Example anticancer effectors may be, but not limited to, an expression of one or more gene selected from the group consisting of exolysin A of *Pseudomonas aeruginosa* (ExlA), non-hemolytic enterotoxin (Nhe) of *Bacillus cereus*, hemolysins, and vacuolating toxin of *Helicobacter pylori*.

For example, an example embodiment of a heterologous expression of ExlA from *Pseudomonas aeruginosa* in *E. coli* is described as above, but expression of one or more homologous or heterologous genes of other medical effectors may also be used.

For example, a constitutive promoter oxb18 is described as above, but the expression of medical effectors may be driven by other constitutive promoters or inducible promoters. Example inducible promoters may be inducible according to tumor-specific microenvironment such as hypoxia or low-glucose conditions.

For example, other appropriate leader sequences and termination regions or other sequences or motifs may be introduced to the medical effector gene sequences to improve the expression of the protein in the bacteria.

For example, the gene exlA described as above is expressed in a plasmid pBAD, but other suitable plasmids may be used and the genes may be incorporated into the chromosome instead of expressing in a plasmid. The medical effector gene may be expressed in a plasmid, but may also be expressed chromosomally if the gene is inserted into the bacterial chromosome.

For example, the short-lived bacteria such as SH3, SH4, mp107, mp105 and mp106 in the example embodiments described above are useful in treating a disease or a condition in a subject. However, the short-lived bacteria may also be used as vaccines to prevent cancers or infectious diseases, or useful in diagnosis.

For example, the gene expression of short-lived bacteria for treating cancers may be other medical effectors or anticancer factors such as CpG, cyclic di-nucleotide, antigens, or other cytotoxins such as non-hemolytic enterotoxin (Nhe) of *Bacillus cereus*, hemolysins, and vacuolating toxin of *Helicobacter pylori*, or the combinations of these anticancer factors.

What is claimed is:

1. A genetically engineered live bacterium comprising
   at least one effector gene that encodes at least one medical effector; and
   at least one gene modification that shortens the bacterium's lifespan such that the live bacterium, after being administered to a subject, survives within a time that is sufficiently long to allow the medical effector to exert at least one medical action and dies after the time to minimize pathogenesis to the subject;
   wherein the bacterium is derived from a virulent strain; and
   wherein the at least one effector gene comprises a cytotoxin gene and a partial DNA fragment of the hemolysin III-encoding gene.

2. The bacterium of claim 1, wherein the medical effector is an antigen that can elicit at least one immune response in the subject sufficient to treat a target disease or condition, or a therapeutic factor that can elicit at least one immune response in the subject and/or reduce the size of a target lesion sufficiently to treat the target disease or condition.

3. The bacterium of claim 2, wherein the immune response is elicited by CD4+ and/or CD8+ T cells.

4. The bacterium of claim 2, wherein the medical effector is expressed from a homologous gene of the bacterium.

5. The bacterium of claim 2, wherein the medical effector is expressed from a heterologous gene.

6. The bacterium of claim 2, wherein the medical effector is a therapeutic factor that can elicit at least one immune response in the subject and/or reduce the size of a target lesion sufficient to treat the target disease or condition, wherein the therapeutic factor is a cytotoxin that causes cell lysis in the target lesion.

7. The bacterium of claim 2, wherein the target disease or condition is cancer or a tumor and wherein the medical effector causes tumor repression in the subject.

8. The bacterium of claim 1, wherein the gene modification is a deletion or a mutation of at least one essential or auxotrophic gene from a chromosome of the bacterium.

9. The bacterium of claim 1, wherein the bacterium is an auxotroph in diaminopimelic acid.

10. The bacterium of claim 1, wherein the gene modification is a deletion of aspartate-semialdehyde dehydrogenase (asd) from a chromosome of the bacterium.

11. The bacterium of claim 1, wherein the bacterium has a survival time controllable by exposure of the bacterium to one or more modulating effectors that modulate the survival time of the bacterium when administered in vivo.

12. The bacterium of claim 11, wherein the modulating effector is diaminopimelic acid.

13. The bacterium of claim 1, wherein the medical effector is a homologous peptide expressed by a gene selected from the group consisting of chuA, yjaA, tspE4C2, sat, sfa, papG, fyuA, iutA, hlyCABD, yfcV, and pks island.

14. The bacterium of claim 1, wherein the medical effector is a cytotoxin selected from the group consisting of exolysin A of *Pseudomonas aeruginosa* (ExlA), non-hemolytic enterotoxin (Nhe) of *Bacillus cereus*, hemolysins, and vacuolating toxin of *Helicobacter pylori* and combinations thereof.

15. The bacterium of claim 1, wherein the medical effector is an anticancer factor selected from the group consisting of CpG, cyclic di-nucleotide and tumor antigens.

16. The bacterium of claim 1, wherein the bacterium is derived from *Escherichia*, *Salmonella*, *Shigella*, *Listeria*, *Bacteroides*, *Bifidobacterium*, *Clostridium*, *Lactobacillus* or *Lactococcus*.

17. The bacterium of claim 16, wherein the bacterium is derived from *Escherichia coli*.

18. The bacterium of claim 1, wherein the bacterium is derived from a strain SH3 deposited at the China General Microbiological Culture Collection Center (CGMCC) under deposit no. 19836.

19. The bacterium of claim 1, wherein the bacterium expresses a protein encoded by a sequence having 80%, 85%, 90%, 95% or 100% sequence identity to all or a fragment of SEQ ID No: 35.

20. The bacterium of claim 1, wherein the bacterium is derived from a strain mp107 deposited at the China General Microbiological Culture Collection Center (CGMCC) under deposit no. 19835.

21. The bacterium of claim 1, wherein the bacterium is formulated to be administered intravenously.

22. The bacterium of claim 1, wherein, when administered intravenously, the time sufficient to minimize pathogenesis is less than 2 days, 5 days or 11 days.

23. The bacterium of claim 1, wherein the bacterium is formulated to be administered locally.

24. The bacterium of claim 1, wherein the bacterium, when administered locally at an injection site, survives in the injection site for up to 5 days but dies within 48 hours outside the injection site.

25. The bacterium of claim 2, wherein the disease is a cancer or tumor and the bacterium is administered intratumorally.

26. The bacterium of claim 1, wherein the cytotoxin is exolysin A of *Pseudomonas aeruginosa* (ExlA).

27. The bacterium of claim 1, wherein the bacterium is derived from a strain mp106 deposited at the China General Microbiological Culture Collection Center (CGMCC) under deposit no. 22556.

28. The bacterium of claim 1, further comprising at least one virulence gene modification that attenuates the virulence of the bacterium.

29. The bacterium of claim 28, wherein the at least one virulence gene modification is a deletion or a mutation of at least one virulence gene from a chromosome of the bacterium.

30. The bacterium of claim 28, wherein the virulence gene modification is a deletion of a hlyCABD operon from a chromosome of the bacterium.

31. The bacterium of claim 28, wherein the bacterium is derived from a strain SH4 deposited at the China General Microbiological Culture Collection Center (CGMCC) under deposit no. 22557.

32. The bacterium of claim 28, wherein the bacterium expresses a protein encoded by a sequence having 80%, 85%, 90%, 95% or 100% sequence identity to all or a fragment of SEQ ID No: 40.

33. The bacterium of claim 28, wherein the bacterium expresses a first protein encoded by a first sequence having 80%, 85%, 90%, 95% or 100% sequence identity to all or a fragment of SEQ ID No: 41 and/or a second protein encoded by a second sequence having 100% sequence identity to all of SEQ ID No: 42.

34. The bacterium of claim 32, wherein the bacterium is derived from a strain mp105 deposited at the China General Microbiological Culture Collection Center (CGMCC) under deposit no. 22555.

35. The bacterium of claim 28, wherein the bacterium is formulated to be administered in combination of intravenous injection and intratumoral injection.

36. A live bacterium vaccine, comprising the bacterium of claim 1 and, optionally, an adjuvant.

37. A method of constructing a genetically engineered live bacterium of claim 1, comprising the steps of:
- genetically engineering a bacterium derived from a virulent strain, such that the bacterium comprises:
- at least one effector gene that encodes at least one medical effector; and
- at least one gene modification that shortens the bacterium's lifespan such that the live bacterium, after being administered to a subject, survives within a time that is sufficiently long to allow the medical effector to exert at least one medical action and dies after the time to minimize pathogenesis to the subject;
- wherein the at least one effector gene comprises a cytotoxin gene and a partial DNA fragment of the hemolysin III-encoding gene.

* * * * *

SEQUENCE LISTING

```
<160> NUMBER OF SEQ ID NOS: 42

<210> SEQ ID NO 1
<211> LENGTH: 64
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(64)
<223> OTHER INFORMATION: Asd-F primer

<400> SEQUENCE: 1
tcacttgcga ctttggctgc tttttgtatg gtgaaagatg tgccaaatag gcgtatcacg      60
aggc                                                                   64

<210> SEQ ID NO 2
<211> LENGTH: 66
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(66)
<223> OTHER INFORMATION: Asd-R primer

<400> SEQUENCE: 2
gcactagcag gggcggcatc gcgccccaga tttaatgaat aaagatagtg aacctcttcg      60
agggac                                                                 66

<210> SEQ ID NO 3
<211> LENGTH: 20
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(20)
<223> OTHER INFORMATION: asd-F2

<400> SEQUENCE: 3
taggtttccg agcggatcca                                                  20
```

```
<210> SEQ ID NO 4
<211> LENGTH: 21
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(21)
<223> OTHER INFORMATION: Cm-R3 (reverse)

<400> SEQUENCE: 4
cctcttacgt gccgatcaac g                                              21

<210> SEQ ID NO 5
<211> LENGTH: 20
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<223> OTHER INFORMATION: hly operon-F

<400> SEQUENCE: 5
actcagcagg acaaagcacg                                                20

<210> SEQ ID NO 6
<211> LENGTH: 20
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(20)
<223> OTHER INFORMATION: hly operon-R

<400> SEQUENCE: 6
gaggccaatg agtttctctg                                                20

<210> SEQ ID NO 7
<211> LENGTH: 20
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(20)
<223> OTHER INFORMATION: vat-F

<400> SEQUENCE: 7
gaactagccc gaagggtatg                                                20

<210> SEQ ID NO 8
<211> LENGTH: 23
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(23)
<223> OTHER INFORMATION: vat-R

<400> SEQUENCE: 8
tggagatcag atgaactgtg ttc                                            23
```

```
<210> SEQ ID NO 9
<211> LENGTH: 20
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(20)
<223> OTHER INFORMATION: pks-left-F

<400> SEQUENCE: 9
aatcaaccca gctgcaaatc                                            20

<210> SEQ ID NO 10
<211> LENGTH: 20
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(20)
<223> OTHER INFORMATION: pks-left-R

<400> SEQUENCE: 10 caccccatc attaaaaacg                                             20

<210> SEQ ID NO 11
<211> LENGTH: 20
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(20)
<223> OTHER INFORMATION: pks-right-F

<400> SEQUENCE: 11
agccgtatcc tgctcaaaac                                            20

<210> SEQ ID NO 12
<211> LENGTH: 20
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(20)
<223> OTHER INFORMATION: pks-right-R

<400> SEQUENCE: 12
tcggtatgtc cggttaaagc                                            20

<210> SEQ ID NO 13
<211> LENGTH: 22
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(22)
<223> OTHER INFORMATION: papG-F

<400> SEQUENCE: 13
gcgctaataa tcattatgcg gc                                         22
```

```
<210> SEQ ID NO 14
<211> LENGTH: 21
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(21)
<223> OTHER INFORMATION: papG-R

<400> SEQUENCE: 14
caatatcatg agcagcgttg c                                              21

<210> SEQ ID NO 15
<211> LENGTH: 22
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(22)
<223> OTHER INFORMATION: sat-F

<400> SEQUENCE: 15
ggataaggac tttaatccgc tg                                             22

<210> SEQ ID NO 16
<211> LENGTH: 21
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(21)
<223> OTHER INFORMATION: sat-R

<400> SEQUENCE: 16
ttgatcgcgt tatccacgtt g                                              21

<210> SEQ ID NO 17
<211> LENGTH: 20
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(20)
<223> OTHER INFORMATION: fyrA-F

<400> SEQUENCE: 17
tgacacggct ttatcctctg                                                20

<210> SEQ ID NO 18
<211> LENGTH: 19
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(19)
<223> OTHER INFORMATION: fyrA-R

<400> SEQUENCE: 18
gttgttggct gatgccgag                                                 19
```

```
<210> SEQ ID NO 19
<211> LENGTH: 20
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(20)
<223> OTHER INFORMATION: iutA-F

<400> SEQUENCE: 19
aagctggaag gcgtgaaagt                                               20

<210> SEQ ID NO 20
<211> LENGTH: 20
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(20)
<223> OTHER INFORMATION: iutA-R

<400> SEQUENCE: 20
taacccgggc tgtagtacag                                               20

<210> SEQ ID NO 21
<211> LENGTH: 22
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(22)
<223> OTHER INFORMATION: yfcV-F

<400> SEQUENCE: 21
gagtaagttt gccaaaacag cc                                            22

<210> SEQ ID NO 22
<211> LENGTH: 21
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(21)
<223> OTHER INFORMATION: yfcV-R

<400> SEQUENCE: 22
ctggaaatct ttcggtgtgg t                                             21

<210> SEQ ID NO 23
<211> LENGTH: 20
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(20)
<223> OTHER INFORMATION: chuA-F

<400> SEQUENCE: 23
```
gacgaaccaa cggtcaggat                                                      20

<210> SEQ ID NO 24
<211> LENGTH: 20
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(20)
<223> OTHER INFORMATION: chuA-R

<400> SEQUENCE: 24
tgccgccagt accaaagaca                                                      20

<210> SEQ ID NO 25
<211> LENGTH: 20
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(20)
<223> OTHER INFORMATION: yjaA-F

<400> SEQUENCE: 25
tgaagtgtca ggagacgctg                                                      20

<210> SEQ ID NO 26
<211> LENGTH: 21
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(21)
<223> OTHER INFORMATION: yjaA-R

<400> SEQUENCE: 26
atggagaatg cgttcctcaa c                                                    21

<210> SEQ ID NO 27
<211> LENGTH: 20
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(20)
<223> OTHER INFORMATION: TspE4C2-F

<400> SEQUENCE: 27
gagtaatgtc ggggcattca                                                      20

<210> SEQ ID NO 28
<211> LENGTH: 20
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(20)
<223> OTHER INFORMATION: TspE4C2-R

<400> SEQUENCE: 28
cgcgccaaca aagtattacg					20

<210> SEQ ID NO 29
<211> LENGTH: 23
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(23)
<223> OTHER INFORMATION: sfa-F

<400> SEQUENCE: 29
ccctcgtgga gcctttttta tat					23

<210> SEQ ID NO 30
<211> LENGTH: 21
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(21)
<223> OTHER INFORMATION: sfa-R

<400> SEQUENCE: 30
cactgttaac ctcttctggt c					21

<210> SEQ ID NO 31
<211> LENGTH: 20
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(20)
<223> OTHER INFORMATION: iutA-F

<400> SEQUENCE: 31
aagctggaag gcgtgaaagt					20

<210> SEQ ID NO 32
<211> LENGTH: 20
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(20)
<223> OTHER INFORMATION: iutA-R

<400> SEQUENCE: 32
taacccgggc tgtagtacag					20

<210> SEQ ID NO 33
<211> LENGTH: 20
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(20)
<223> OTHER INFORMATION: oxb-F

<400> SEQUENCE: 33
ctgttgtgac cgcttgctct                                                    20

<210> SEQ ID NO 34
<211> LENGTH: 21
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(21)
<223> OTHER INFORMATION: exlA-R

<400> SEQUENCE: 34
gaggtggaag acaggattgt c                                                  21

<210> SEQ ID NO 35
<211> LENGTH: 5567
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(286)
<223> OTHER INFORMATION: OXB18 promoter and ribosome binding site
<220> FEATURE:
<221> NAME/KEY: misc_feature
<222> LOCATION: (287)..(352)
<223> OTHER INFORMATION: start codon ATG followed by pelB leader
      sequence
<220> FEATURE:
<221> NAME/KEY: misc_feature
<222> LOCATION: (353)..(5387)
<223> OTHER INFORMATION: exlA gene of Pseudomonas aeruginosa PA7 without
      start codon
<220> FEATURE:
<221> NAME/KEY: misc_feature
<222> LOCATION: (5388)..(5545)
<223> OTHER INFORMATION: rrnB transcription termination region

<400> SEQUENCE: 35
atctaagctg ttgtgaccgc ttgctctagc cagctatcga gttgtgaacc gatccatcta        60
gcaattggtc tcgatctagc gataggcttc gatctagcta tgtagaaacg ccgtgtgctc       120
gatcgcttta taaggtccac agtagctgct ataattgctt caacagaaca tattgactat       180
ccggtattac ccggcagatc tttgtcgatc ctaccatcca ctcgacacac cgccagcgg        240 ccgctgccaa gcttccgagc tctcgaattc aaaggaggta cccaccatga atacctgct       300 gccgaccgct gctgctggtc tgctgctcct cgctgcccag ccggcgatgg cccatagaga       360
caatcctgtc ttccacctct ccccccgggg aaaactccgt tgcctgatcg ccggcctgct       420
gctggcgccc cacctgcccc aggctttcgc cggcgggctg gaggcggccg gcgggccggg       480
cggcacgccg caactgctca accagggcgg cgtgcccatc gtcaatatcg tcgcgccgaa       540
cgccgccggc ctgtcgcaca accagttcct cgactacaac gtcgaccgcc agggcctggt       600
cctcaacaat gcgctgcaag ccggcgcctc gcagctcgcc ggacaactgg cggccaaccc       660
gcagctgcgc ggcgacgccg ccagtgccat cctcaacgaa gtgatcagcc gcaacgcctc       720
ggcgatcaac ggcccgcagg aaatcttcgg ccaggccgcc gactacatcc tggccaaccc       780
caacggcatc tcggtgaacg gcggcagctt catcaacacg ccccatgcca gctgctggt        840 cggccgtccg gaactggccg acggcaagct gcaggcgctg aacaccaacg acgccgtcgg       900
cgccctgcag atccagggcc agggcctgag caacccggat ggcagcatcg ccctgctggc       960

```
gccgcgagtc gacagccaag gcaagatcga ggcgtcggcc gagctcgacc tgaccgtcgg   1020
tcgcaaccgc atcgactacc cgagcggcaa ggtcgagcgc gacccgtccg gcgacgtccg   1080
tccgggcgag cggcgcatcg acgccagcct gttcggcgcc atgcaggccg gacgcatcaa   1140
catcctcagc accgccgagg gcgccggcgt gcgcgtcggc ccggtcggga tcgacggcag   1200
ggacggcgtc gacctgcgct ccgccggcga cctgtcgatc agcggccagg cgcttcccga   1260
caacagcctg aacgccttgc gcgcggcgat ccgcagcgac agcggcaacg tcggcctgca   1320
tgcccgcggc gacctgagcc tggccgccgc cgacgtcagc ggcggcaggg tcgacctcaa   1380
gtccgggcgc aacctgaccc tgggcagcgt ggaaagccgc aacctgcggg aaagccgcga   1440
gcgctggagc aacagcacca tcggcatcac ctgggaaacc tacgaccgca cgcgtaccgt   1500
caccgattcg aagcagcacg gcagccggat cgatgcccgc gccgacgcga gcctggccgc   1560
gcggggcgac agcgaactga gggcggcgac ggtcaaggcc ggcgctaccc tgaaagtctc   1620
cagcggcggc gataccgtc ttctcgccgc caccgagacc cgcaccgaac gcgaccaggg   1680
cgcgcaccgc aagcacctgt ggaaagccaa ctgggacaag ggcagcagcg agcaacgcag   1740
cgtggccagc agcctcgaag gcgcgcgggt cgaactcggc ggcggccggc gcctgaatct   1800
ggaaggcgcc gacgtggcca ccgcggcga cctcgacctg caagccaaga gcgtcgacat   1860
cggcagcgcc agccgcagcc acagcagccg gacaacagc tactccggcg acctggtcgg   1920
cggcagcttc ttcggcagcc acggcgatgg cgacagcggc aagaccctgc aacagggcag   1980
ccgggtcaag gccgacggcg cactgacggt gaccgccgat gcggtcgagg tgcgcggcag   2040
ccaggtacgc ggcgcgcgca aggccgaggt agtcagcggg aaaggctcgc tgcgcatcga   2100
cggcgtggag gaaaccgccc acagcaacag ctacagcaag gacagcaagt tcttcggcat   2160
cgccaaggac gagagtcgcc agcgcagcaa ggacagcagc aaccgcgcca gcgaagtacg   2220
ctcggacaga aacctgaccc tgcgcagcgc cgccgacatc gccattcgcg gctcccgggt   2280
cgaggctggc ggcgccctcg ccgccgaggc caagggcaac ctggagatag cctcggcgca   2340
ggagcgccac gacggcaacg acagccgcca caccgcggc ttcgacgcct atgccggcga   2400
gcagacccca ggcagccgcc aataccgcgc cggggtgcgc taccaggacc agcggaccag   2460
cgtccgccgc gaggaaaccc gcaacagcgg ctccagcctg gcggcgcct ccctggccgt   2520 gaaggccggc ggcgatctca ccgtgaaggg ggccgagctg aaggccagcg cgggcgacgc   2580
cagcctctcc gggaagaacg tcgccctgct cgccgagcag gacagcaaga cccgcagcag   2640
cgaacagacc accaccggcg gcggcttcta ctataccggc ggcctggacc gtgccggcag   2700
cggtatcgaa gtcggccacc agcggatcga cgagaacgac gccgaaagcc atgcgcgcac   2760
cagccaggtg aacgcgacgg gcaatctcag gatcgacgcc gcccagggca gcctgacgac   2820
gcagggcgcg cgcctggagg ccggcgacag cctggcggtc gccgccggca cggtcgacaa   2880
ccaggccgcc cgcgacagcc agagcagcca gcgccacgac agcggctgga gcggcgacat   2940
cggcgccaac ctcgagtacc gcggcatcgc ccggccgatc gagaaggcgg tcgaaggcgt   3000
cgcccagcgc aaggtccacc agcccggcct gctcgacaac ctggagcagc gaacgtcgg   3060 cgtcgacctc gagatcagcc accgacagc cgcggcgag caacaggcga gccaggcgca   3120
ggtcagcagc ttcgcgggcg gccaggtcga actgaaggtc ggcgacgccc tgcgggacga   3180
gggcacccgt taccaggctc gcagcggagg cctcctcatc gacgccgcca ggcatgacgc   3240
cagggcggcg gagaacacct ccggcagcca tgagcagagc ctcgacgcca aggtcggcgg   3300
```

```
gcgcctctac accaccaccg gccaggacct gaacctgcgc ctgagcggca ttggcggcag      3360
cagcgagaac agcgccagcc agaccaccgc ggtggtcggc gaatacgccg cgaagcaggg      3420
cgtcgagatc cgcctcggcg gagacggcct ctaccagggc agccgcttcg acggcggcga      3480
agccggggtc aggctcagcg ccggcggcaa cctggccctg aacaggcca acgaccggca       3540
gagcgccagc agcgccagcc tgcgtggcga cgccgcgttg agcggcggca tggcccccag      3600
cgccaacggc aaagggctga acgccagcgc cggcctgcaa ctcgaccaca aggcggcga       3660
cagccgggac agccaggcgc gggtcgccga catccaggcc aagggcgcgg tggagctgcg      3720
cagcggcggc gatctggtcc tgcaaggcag caatatcggc agcgcggcag cgaagaccgg      3780
cgacatagtc ctggccgccg gcggcaagct cgacctgcag gccgcccgcg atagccaccg      3840
ggccggggga acaacctcg gcggcggctt cagcctaggc ggcggcagcg ttcgcgacgc       3900
cgaaacgagc agcaagaacg gcagcgtcag cggcaacttc aacatcggcc gggtcgacga      3960
ggaacgtcac gcgctgaacg gcggcaacct gcacagcgcg accaaggcca gcctttccag      4020
cgccgcagac gacgccaccg cggtacgcct gcaaggcact cgcatcgaag ccgcccaggt      4080
cagcctcgaa gccggcaacg gcggcattct ccaggagtcc gccgaatcca gcgagcggcg      4140
cgacaactgg ggcgtgctgc tcggtgccgg ggccaacggc ggcaagacca ccggcgcgcc      4200
gagcgactac cggagcgact atgccgtcca ggcccgcgcc aaggtcgatg tcgatgtcct      4260
gcgcagccag acccagggcg acagcgtcat ccaggccgac cgggtaatcc tggcgagcca      4320
gggcgacacc cgcctggagg gcgcgcgcat cgacgcggca caggtggacg ggcgcatcgg      4380
cggcgacctg cgggtggaga ccgccagga ccgcgcggag ggcgtgaagg tcaacgtcga       4440
cgcgcgcctg ggcgtggaga agaaccagcc cggcctggtg aacaagctgg cgagcaagac      4500
cggaccgttg aaggacaagc tggaaaccaa ggccgagaat gctttcgaca agcaccgcgg      4560
caagttggag aacggcatcg accgtaatgt cgagcggctc ggcaaggccg gggacaacct      4620
cctcgccaaa gccgaaaagg ccaaggagcg cctgggcgag aagctggtcc gcagcggcag      4680
ctacgaggtc aacccggagc cgcgcggcgc cttcgccagc aagctggaca gggccagggg      4740
ctatctggcg gagaaaggcg aagcgctcgg cgaccggctg tccggcctca gcagcgcct       4800
gtcgccgaac aagaccggta gctatgtggt gaacgacaag cagacggccg cgccaaggt      4860
cggcaatgcc gccgagaacg tgctgttcgg cgacaagagc ggcgaagcct cggtaacccc      4920
gacgctgtac ctgacgtca gccacgtcag ccgcaactac gtcaccgagg cctccggcat       4980
caccggcagg cagggcgtga acctgcaggt gggcgcagcg acccagctga ccggcgcacg      5040
gatcagcgcc agcgacggca aggtcgacct cggcggctcg cgcgtggaaa cccgcgccct      5100
ggccggcaag gactaccgcg ccgatctcgg cctgaacgtc tccaggtcgc cggtggacct      5160
ggccttcggt atcaaggacg agttcagcca ggagcacgac caggcgaccc gcgacgacca      5220
ggccttcaac ctcggcgccc tgcgcgtcgg cggacgcaac cgcgaccagc agttgcaggc      5280
cggcatcgag cagaaggccg actaatgagt ttaaacggtc tccagcttag gtaacagcct      5340
gatacagatt aaatcagaac gcagaagcgg tctgataaaa cagaatttgc ctggcggcag      5400
tagcgcggtg gtcccacctg accccatgcc gaactcagaa gtgaaacgcc gtagcgccga      5460
tggtagtgtg gggtctcccc atgcgagagt agggaactgc caggcatcaa ataaaacgaa      5520
aggctcagtc gaaagactgg gcctttcgtt ttatctgttg tttgtcg                   5567
```

<210> SEQ ID NO 36
<211> LENGTH: 64

```
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(64)
<223> OTHER INFORMATION: M-hly-F

<400> SEQUENCE: 36
ttggtttgct ttttttacc tgccaccgca atgaatgctt tttttaatag gcgtatcacg    60
aggc                                                                64

<210> SEQ ID NO 37
<211> LENGTH: 66
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(66)
<223> OTHER INFORMATION: M-hly-R

<400> SEQUENCE: 37
ttaacgctca tgtaaacttt ctgttacaga ctcttccaga ggacttagtg aacctcttcg    60
agggac                                                              66

<210> SEQ ID NO 38
<211> LENGTH: 20
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(20)
<223> OTHER INFORMATION: 27F

<400> SEQUENCE: 38
agagtttgat cctggctcag                                               20

<210> SEQ ID NO 39
<211> LENGTH: 21
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(21)
<223> OTHER INFORMATION: 1492R

<400> SEQUENCE: 39
tacggctacc ttgtacgact t                                             21

<210> SEQ ID NO 40
<211> LENGTH: 6305
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(286)
<223> OTHER INFORMATION: OXB18 promoter and ribosome binding site
<220> FEATURE:
<221> NAME/KEY: misc_feature
<222> LOCATION: (287)..(352)
```

```
<223> OTHER INFORMATION: start codon ATG followed by pelB leader
      sequence
<220> FEATURE:
<221> NAME/KEY: misc_feature
<222> LOCATION: (353)..(5355)
<223> OTHER INFORMATION: exlA gene of Pseudomonas aeruginosa PA7 without
      start codon
<220> FEATURE:
<221> NAME/KEY: misc_feature
<222> LOCATION: (5356)..(5421)
<223> OTHER INFORMATION: start codon ATG followed by pelB leader
      sequence
<220> FEATURE:
<221> NAME/KEY: misc_feature
<222> LOCATION: (5422)..(6125)
<223> OTHER INFORMATION: partial DNA fragment of the hemolysin
      III-encoding gene without start codon
<220> FEATURE:
<221> NAME/KEY: misc_feature
<222> LOCATION: (6126)..(6305)
<223> OTHER INFORMATION: rrnB transcription termination region

<400> SEQUENCE: 40
```

| | | | |
|---|---|---|---|
| atctaagctg ttgtgaccgc ttgctctagc cagctatcga gttgtgaacc gatccatcta | | | 60 |
| gcaattggtc tcgatctagc gataggcttc gatctagcta tgtagaaacg ccgtgtgctc | | | 120 |
| gatcgcttta taaggtccac agtagctgct ataattgctt caacagaaca tattgactat | | | 180 |
| ccggtattac ccggcagatc tttgtcgatc ctaccatcca ctcgacacac ccgccagcgg | | | 240 |
| ccgctgccaa gcttccgagc tctcgaattc aaaggaggta cccaccatga atacctgct | | | 300 |
| gccgaccgct gctgctggtc tgctgctcct cgctgcccag ccggcgatgg cccatagaga | | | 360 |
| caatcctgtc ttccacctct cccccgggg aaaactccgt tgcctgatcg ccggcctgct | | | 420 |
| gctggcgccc cacctgcccc aggctttcgc cggcgggctg gaggcggccg cgggccggg | | | 480 |
| cggcacgccg caactgctca ccagggcgg cgtgcccatc gtcaatatcg tcgcgccgaa | | | 540 |
| cgccgccggc ctgtcgcaca accagttcct cgactacaac gtcgaccgcc agggcctggt | | | 600 |
| cctcaacaat gcgctgcaag ccggcgcctc gcagctcgcc ggacaactgg cggccaaccc | | | 660 |
| gcagctgcgc ggcgacgccg ccagtgccat cctcaacgaa gtgatcagcc gcaacgcctc | | | 720 |
| ggcgatcaac ggcccgcagg aaatcttcgg ccaggccgcc gactacatcc tggccaaccc | | | 780 |
| caacggcatc tcggtgaacg gcggcagctt catcaacacg ccccatgcca gcctgctggt | | | 840 |
| cggccgtccg gaactggccg acggcaagct gcaggcgctg aacaccaacg acgccgtcgg | | | 900 |
| cgccctgcag atccagggcc agggcctgag caaccgggat ggcagcatcg ccctgctggc | | | 960 |
| gccgcgagtc gacagccaag gcaagatcga ggcgtcggcc gagctcgacc tgaccgtcgg | | | 1020 |
| tcgcaaccgc atcgactacc cgagcggcaa ggtcgagcgc gacccgtccg gcgacgtccg | | | 1080 |
| tccgggcgag cggcgcatcg acgccagcct gttcggcgcc atgcaggccg gacgcatcaa | | | 1140 |
| catcctcagc accgccgagg gcgccggcgt gcgcgtcggc ccggtcggga tcgacggcag | | | 1200 |
| ggacggcgtc gacctgcgct ccgcggcga cctgtcgatc agcggccagg cgcttcccga | | | 1260 |
| caacagcctg aacgccttgc gcgcggcgat ccgcagcgac agcggcaacg tcggcctgca | | | 1320 |
| tgcccgcggc gacctgagcc tggccgccgc cgacgtcagc ggcggcaggg tcgacctcaa | | | 1380 |
| gtccgggcgc aacctgaccc tgggcagcgt ggaaagccgc aacctgcggg aaagccgcga | | | 1440 |
| gcgctggagc aacagcacca tcggcatcac ctgggaaacc tacgaccgca cgcgtaccgt | | | 1500 |
| caccgattcg aagcagcacg gcagccggat cgatgcccgc gccgacgcga gcctggccgc | | | 1560 |
| gcggggcgac agcgaactga gggcggcgac ggtcaaggcc ggcgctaccc tgaaagtctc | | | 1620 |
| cagcggcggc gataccccgtc ttctcgccgc caccgagacc cgcaccgaac gcgaccaggg | | | 1680 |

```
cgcgcaccgc aagcacctgt ggaaagccaa ctgggacaag ggcagcagcg agcaacgcag    1740
cgtggccagc agcctcgaag gcgcgcgggt cgaactcggc ggcggccggc gcctgaatct    1800
ggaaggcgcc gacgtggcca gccgcggcga cctcgacctg caagccaaga gcgtcgacat    1860
cggcagcgcc agccgcagcc acagcagccg cgacaacagc tactccggcg acctggtcgg    1920
cggcagcttc ttcggcagcc acggcgatgg cgacagcggc aagaccctgc aacagggcag    1980
ccgggtcaag gccgacggcg cactgacggt gaccgccgat gcggtcgagg tgcgcggcag    2040
ccaggtacgc ggcgcgcgca aggccgaggt agtcagcggg aaaggctcgc tgcgcatcga    2100
cggcgtggag gaaaccgccc acagcaacag ctacagcaag gacagcaagt tcttcggcat    2160
cgccaaggac gagagtcgcc agcgcagcaa ggacagcagc aaccgcgcca gcgaagtacg    2220
ctcggacagc aacctgaccc tgcgcagcgc cgccgacatc gccattcgcg gctcccgggt    2280
cgaggctggc ggcgccctcg ccgccgaggc caagggcaac ctggagatag cctcggcgca    2340
ggagcgccac gacggcaacg acagccgcca cacccgcgcg ttcgacgcct atgccggcga    2400
gcagacccca ggcagccgcc aataccgcgc cggggtgcgc taccaggacc agcggaccag    2460
cgtccgccgc gaggaaaccc gcaacagcgg ctccagcctg ggcggcgcct ccctggccgt    2520
gaaggccggc ggcgatctca ccgtgaaggg ggccgagctg aaggccagcg cgggcgacgc    2580
cagcctctcc gggaagaacg tcgccctgct cgccgagcag gacagcaaga cccgcagcag    2640
cgaacagacc accaccggcg gcggcttcta ctataccggc ggcctggacc gtgccggcag    2700
cggtatcgaa gtcggccacc agcggatcga cgagaacgac gccgaaagcc atgcgcgcac    2760
cagccaggtg aacgcgacgg gcaatctcag gatcgacgcc gcccagggca gcctgacgac    2820
gcagggcgcg cgcctggagg ccggcgacag cctggcggtc gccgccggca cggtcgacaa    2880
ccaggccgcc cgcgacagcc agagcagcca gcgccacgac agcggctgga gcggcgacat    2940
cggcgccaac ctcgagtacc gcggcatcgc ccggccgatc gagaaggcgg tcgaaggcgt    3000
cgcccagcgc aaggtccacc agcccggcct gctcgacaac ctggagcagc cgaacgtcgg    3060
cgtcgacctc gagatcagcc accgcgacag ccgcggcgag caacaggcga gccaggcgca    3120
ggtcagcagc ttcgcgggcg gccaggtcga actgaaggtc ggcgacgccc tgcgggacga    3180
gggcacccgt taccaggctc gcagcggagg cctcctcatc gacgccgcca ggcatgacgc    3240
cagggcggcg gagaacacct ccggcagcca tgagcagagc ctcgacgcca aggtcggcgg    3300
gcgcctctac accaccaccg gccaggacct gaacctgcgc ctgagcggca ttggcggcag    3360
cagcgagaac agcgccagcc agaccaccgc ggtggtcggc gaatacgccg cgaagcaggg    3420
cgtcgagatc cgcctcggcg gagacggcct ctaccagggc agccgcttcg acggcggcga    3480
agccggggtc aggctcagcg ccggcggcaa cctggccctg aacaggcca acgaccggca    3540 gagcgccagc agcgccagcc tgcgtggcga cgccgcgttg agcggcggca tggcccccag    3600
cgccaacggc aaagggctga acgcagcgc cggcctgcaa ctcgaccaca aggcggcga    3660 cagccgggac agccaggcgc gggtcgccga catccaggcc aagggcgcgg tggagctgcg    3720
cagcggcggc gatctggtcc tgcaaggcag caatatcggc agcgcggcag cgaagaccgg    3780
cgacatagtc ctggccgccg gcggcaagct cgacctgcag gccgcccgcg atagccaccg    3840
ggccggggga acaaccctcg gcggcggctt cagcctaggc ggcggcagcg ttcgcgacgc    3900
cgaaacgagc agcaagaacg gcagcgtcag cggcaacttc aacatcggcc gggtcgacga    3960
ggaacgtcac gcgctgaacg gcggcaacct gcacagcgcg accaaggcca gcctttccag    4020
```

```
cgccgcagac gacgccaccg cggtacgcct gcaaggcact cgcatcgaag ccgcccaggt    4080
cagcctcgaa gccggcaacg gcggcattct ccaggagtcc gccgaatcca gcagcggcg     4140 cgacaactgg ggcgtgctgc tcggtgccgg ggccaacggc ggcaagacca ccggcgcgcc    4200
gagcgactac cggagcgact atgccgtcca ggcccgcgcc aaggtcgatg tcgatgtcct    4260
gcgcagccag acccagggcg acagcgtcat ccaggccgac cgggtaatcc tggcgagcca    4320
gggcgacacc cgcctggagg gcgcgcgcat cgacgcggca caggtggacg ggcgcatcgg    4380
cggcgacctg cgggtggaga gccgccagga ccgcgcggag ggcgtgaagg tcaacgtcga    4440
cgcgcgcctg ggcgtggaga agaaccagcc cggcctggtg aacaagctgg cgagcaagac    4500
cggaccgttg aaggacaagc tggaaaccaa ggccgagaat gctttcgaca agcaccgcgg    4560
caagttggag aacggcatcg accgtaatgt cgagcggctc ggcaaggccg ggacaacct     4620 cctcgccaaa gccgaaaagg ccaaggagcg cctgggcgag aagctggtcc gcagcggcag    4680
ctacgaggtc aacccggagc cgcgcggcgc cttcgccagc aagctggaca gggcagggg     4740 ctatctggcg gagaaaggcg aagcgctcgg cgaccggctg tccggcctca gcagcgcct     4800 gtcgccgaac aagaccggta gctatgtggt gaacgacaag cagacggccg gcgccaaggt    4860
cggcaatgcc gccgagaacg tgctgttcgg cgacaagagc ggcgaagcct cggtaacccc    4920
gacgctgtac ctggacgtca gccacgtcag ccgcaactac gtcaccgagg cctccggcat    4980
caccggcagg cagggcgtga acctgcaggt gggcgcagcg acccagctga ccggcgcacg    5040
gatcagcgcc agcgacggca aggtcgacct cggcggctcg cgcgtggaaa cccgcgccct    5100
ggccggcaag gactaccgcg ccgatctcgg cctgaacgtc tccaggtcgc cggtggacct    5160
ggccttcggt atcaaggacg agttcagcca ggagcacgac caggcgaccc gcgacgacca    5220
ggccttcaac ctcggcgccc tgcgcgtcgg cggacgcaac cgcgaccagc agttgcaggc    5280
cggcatcgag cagaaggccg actaatgagt ttaaacggtc tccagcttag attttcagga    5340
gctaaggaag ctaaaatgaa ataccctgctg ccgaccgctg ctgctggtct gctgctcctc    5400
gctgcccagc cggcgatggc caatacttat gtaagggaac cagttaatgc atttactcac    5460
ttaggtggag cgatattatc atttattgcg ttattagcta tgcttgtgaa agtttctatc    5520
aagatgccat catttgctgc aattacagct gttattttgt ttggtattgg aatgatggtc    5580
ctttatacgg cgtcagctgt atatcatagt gttgtggcca atgaacgtgt tatatacttc    5640
tttaggaagc tagatcattc tatgattttt atattaattg caggtacata tgcacccttt    5700
tgcttaatta cattaaattc agcaagtggt ttgctattat tttgtttagt ctatgcaact    5760
gcgatttgtg gcattgtatt taaaatgttt tggtttaatt gtccaaggtg gttatcgaca    5820
gcaatttata ttacgatggg ttggttaatt gttttattct ttgcaccgtt agctgagaat    5880
ttaagtacag gaggcattat tttcttagta cttggtggca ttttttatac aattggtgga    5940
tttatttatg gaacaaagcc aaaatggtta gagtttaaat atatgggca tcatgaaatt     6000 tttcatgttt ttgtattatt aggtagtctt gcgcattttc taagtgtata ttgttacgta    6060
atttaaaggt aacagcctga tacagattaa atcagaacgc agaagcggtc tgataaaaca    6120
gaatttgcct ggcggcagta gcgcggtggt cccacctgac cccatgccga actcagaagt    6180
gaaacgccgt agcgccgatg gtagtgtggg gtctccccat gcgagagtag ggaactgcca    6240
ggcatcaaat aaaacgaaag gctcagtcga aagactgggc ctttcgtttt atctgttgtt    6300
tgtcg                                                               6305
```

<210> SEQ ID NO 41
<211> LENGTH: 5019
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(66)
<223> OTHER INFORMATION: start codon ATG followed by pelB leader
      sequence
<220> FEATURE:
<221> NAME/KEY: misc_feature
<222> LOCATION: (67)..(5019)
<223> OTHER INFORMATION: exlA gene of Pseudomonas aeruginosa PA7 without
      start codon

<400> SEQUENCE: 41

| | | | | |
|---|---|---|---|---|
| atgaaatacc | tgctgccgac | cgctgctgct | ggtctgctgc | tcctcgctgc | ccagccggcg | 60 |
| atggcccata | gagacaatcc | tgtcttccac | ctctccccccc | ggggaaaact | ccgttgcctg | 120 |
| atcgccggcc | tgctgctggc | gccccacctg | ccccaggctt | cgccggcgg | gctggaggcg | 180 |
| gccggcggc | cgggcggcac | gccgcaactg | ctcaaccagg | gcggcgtgcc | catcgtcaat | 240 |
| atcgtcgcgc | cgaacgccgc | cggcctgtcg | cacaaccagt | tcctcgacta | caacgtcgac | 300 |
| cgccagggcc | tggtcctcaa | caatgcgctg | caagccggcg | cctcgcagct | cgccggacaa | 360 |
| ctggcggcca | acccgcagct | gcgcggcgac | gccgccagtg | ccatcctcaa | cgaagtgatc | 420 |
| agccgcaacg | cctcggcgat | caacggcccg | caggaaatct | tcggccaggc | cgccgactac | 480 |
| atcctggcca | cccccaacgg | catctcggtg | aacggcggca | gcttcatcaa | cacgccccat | 540 |
| gccagcctgc | tggtcggccg | tccggaactg | gccgacggca | agctgcaggc | gctgaacacc | 600 |
| aacgacgccg | tcggcgccct | gcagatccag | ggccagggcc | tgagcaaccg | ggatggcagc | 660 |
| atcgccctgc | tggcgccgcg | agtcgacagc | caaggcaaga | tcgaggcgtc | ggccgagctc | 720 |
| gacctgaccg | tcggtcgcaa | ccgcatcgac | tacccgagcg | gcaaggtcga | gcgcgacccg | 780 |
| tccggcgacg | tccgtccggg | cgagcggcgc | atcgacgcca | gcctgttcgg | cgccatgcag | 840 |
| gccggacgca | tcaacatcct | cagcaccgcc | gagggcgccg | gcgtgcgcgt | cggcccggtc | 900 |
| gggatcgacg | gcagggacgg | cgtcgacctg | cgctccgccg | cgacctgtc | gatcagcggc | 960 |
| caggcgcttc | ccgacaacag | cctgaacgcc | ttgcgcgcgg | cgatccgcag | cgacagcggc | 1020 |
| aacgtcggcc | tgcatgcccg | cggcgacctg | agcctggccg | ccgccgacgt | cagcggcggc | 1080 |
| agggtcgacc | tcaagtccgg | gcgcaacctg | accctgggca | gcgtggaaag | ccgcaacctg | 1140 |
| cgggaaagcc | gcgagcgctg | gagcaacagc | accatcggca | tcacctggga | aacctacgac | 1200 |
| cgcacgcgta | ccgtcaccga | ttcgaagcag | cacggcagcc | ggatcgatgc | ccgcgccgac | 1260 |
| gcgagcctgg | ccgcgcgggg | cgacagcgaa | ctgagggcgg | cgacggtcaa | ggccggcgct | 1320 |
| accctgaaag | tctccagcgg | cggcgatacc | cgtcttctcg | ccgccaccga | gacccgcacc | 1380 |
| gaacgcgacc | agggcgcgca | ccgcaagcac | ctgtggaaag | ccaactggga | caagggcagc | 1440 |
| agcgagcaac | gcagcgtggc | cagcagcctc | gaaggcgcgc | gggtcgaact | cggcggcggc | 1500 |
| cggcgcctga | atctggaagg | cgccgacgtg | ccagccgcg | cgacctcga | cctgcaagcc | 1560 |
| aagagcgtcg | acatcggcag | cgccagccgc | agccacagca | gccgcgacaa | cagctactcc | 1620 |
| ggcgacctgg | tcggcggcag | cttcttcggc | agccacggcg | atggcgacag | cggcaagacc | 1680 |
| ctgcaacagg | gcagccgggt | caaggccgac | ggcgcactga | cggtgaccgc | cgatgcggtc | 1740 |
| gaggtgcgcg | gcagccaggt | acgcggcgcg | cgcaaggccg | aggtagtcag | cgggaaaggc | 1800 |

```
tcgctgcgca tcgacggcgt ggaggaaacc gcccacagca acagctacag caaggacagc    1860
aagttcttcg gcatcgccaa ggacgagagt cgccagcgca gcaaggacag cagcaaccgc    1920
gccagcgaag tacgctcgga cagcaacctg accctgcgca gcgccgccga catcgccatt    1980
cgcggctccc gggtcgaggc tggcggcgcc ctcgccgccg aggccaaggg caacctggag    2040
atagcctcgg cgcaggagcg ccacgacggc aacgacagcc gccacacccg cggcttcgac    2100
gcctatgccg cgagcagac cccaggcagc cgccaatacc gcgccggggt gcgctaccag    2160
gaccagcgga ccagcgtccg ccgcgaggaa acccgcaaca gcggctccag cctgggcggc    2220
gcctccctgg ccgtgaaggc cggcggcgat ctcaccgtga aggggggccga gctgaaggcc    2280 agcgcgggcg acgccagcct ctccgggaag aacgtcgccc tgctcgccga gcaggacagc    2340
aagacccgca gcagcgaaca gaccaccacc ggcggcggct tctactatac cggcggcctg    2400
gaccgtgccg gcagcggtat cgaagtcggc caccagcgga tcgacgagaa cgacgccgaa    2460
agccatgcgc gcaccagcca ggtgaacgcg acgggcaatc tcaggatcga cgccgcccag    2520
ggcagcctga cgacgcaggg cgcgcgcctg gaggccggca cagcctggc ggtcgccgcc    2580 ggcacggtcg acaaccaggc cgcccgcgac agccagagca gccagcgcca cgacagcggc    2640
tggagcggcg acatcggcgc caacctcgag taccgcggca tcgcccggcc gatcgagaag    2700
gcggtcgaag gcgtcgccca gcgcaaggtc caccagcccg gcctgctcga caacctggag    2760
cagccgaacg tcggcgtcga cctcgagatc agccaccgcg acagccgcgg cgagcaacag    2820
gcgagccagg cgcaggtcag cagcttcgcg ggcggccagg tcgaactgaa ggtcggcgac    2880
gccctgcggg acgagggcac ccgttaccag gctcgcagcg gaggcctcct catcgacgcc    2940
gccaggcatg acgccagggc ggcggagaac acctccggca gccatgagca gagcctcgac    3000
gccaaggtcg gcgggcgcct ctacaccacc accggccagg acctgaacct gcgcctgagc    3060
ggcattggcg gcagcagcga aacagcgcc agccagacca ccgcggtggt cggcgaatac    3120
gccgcgaagc agggcgtcga gatccgcctc ggcggagacg gcctctacca gggcagccgc    3180
ttcgacggcg gcgaagccgg ggtcaggctc agcgccggcg gcaacctggc cctggaacag    3240
gccaacgacc ggcagagcgc cagcagcgcc agcctgcgtg gcgacgccgc gttgagcggc    3300
ggcatggccc ccagcgccaa cggcaaaggg ctgaacgcca gcgccggcct gcaactcgac    3360
cacaaggccg gcgacagccg ggacagccag gcgcgggtcg ccgacatcca ggccaagggc    3420
gcggtggagc tgcgcagcgg cggcgatctg gtcctgcaag gcagcaatat cggcagcgcg    3480
gcagcgaaga ccgcgacat agtcctggcc gccggcggca gctcgacct gcaggccgcc    3540 cgcgatagcc accgggccgg gggaaacaac ctcggcggcg gcttcagcct aggcggcggc    3600
agcgttcgcg acgccgaaac gagcagcaag aacggcagcg tcagcggcaa cttcaacatc    3660
ggccgggtcg acgaggaacg tcacgcgctg aacggcggca acctgcacag cgcgaccaag    3720
gccagccttt ccagcgccgc agacgacgcc accgcggtac gcctgcaagg cactcgcatc    3780
gaagccgccc aggtcagcct cgaagccggc aacggcggca ttctccagga gtccgccgaa    3840
tccagcgagc ggcgcgacaa ctggggcgtg ctgctcggtg ccggggccaa cggcggcaag    3900
accaccggcg cgccgagcga ctaccggagc gactatgccg tccaggcccg cgccaaggtc    3960
gatgtcgatg tcctgcgcag ccagacccag ggcgacagcg tcatccaggc cgaccgggta    4020
atcctggcga gccagggcga cacccgcctg agggcgcgc gcatcgacgc ggcacaggtg    4080
gacgggcgca tcgcggcgga cctgcggggtg gagagccgcc aggaccgcgc ggagggcgtg    4140
aaggtcaacg tcgacgcgcg cctgggcgtg gagaagaacc agcccggcct ggtgaacaag    4200
```

```
ctggcgagca agaccggacc gttgaaggac aagctggaaa ccaaggccga gaatgctttc    4260
gacaagcacc gcggcaagtt ggagaacggc atcgaccgta atgtcgagcg gctcggcaag    4320
gccggggaca acctcctcgc caaagccgaa aaggccaagg agcgcctggg cgagaagctg    4380
gtccgcagcg gcagctacga ggtcaacccg gagccgcgcg gcgccttcgc cagcaagctg    4440
gacagggcca ggggctatct ggcggagaaa ggcgaagcgc tcggcgaccg gctgtccggc    4500
ctcaagcagc gcctgtcgcc gaacaagacc ggtagctatg tggtgaacga caagcagacg    4560 gccgcgcca aggtcggcaa tgccgccgag aacgtgctgt tcggcgacaa gagcggcgaa    4620
gcctcggtaa ccccgacgct gtacctggac gtcagccacg tcagccgcaa ctacgtcacc    4680
gaggcctccg gcatcaccgg caggcagggc gtgaacctgc aggtgggcgc agcgacccag    4740
ctgaccggcg cacggatcag cgccagcgac gcaaggtcg acctcggcgg ctcgcgcgtg    4800
gaaacccgcg ccctggccgg caaggactac cgcgccgatc tcggcctgaa cgtctccagg    4860
tcgccggtgg acctggcctt cggtatcaag gacgagttca gccaggagca cgaccaggcg    4920
acccgcgacg accaggcctt caacctcggc gccctgcgcg tcggcggacg caaccgcgac    4980
cagcagttgc aggccggcat cgagcagaag gccgactaa                          5019
```

<210> SEQ ID NO 42
<211> LENGTH: 711
<212> TYPE: DNA
<213> ORGANISM: Artificial Sequence
<220> FEATURE:
<223> OTHER INFORMATION: Synthetic
<220> FEATURE:
<221> NAME/KEY: misc_feature
<222> LOCATION: (1)..(66)
<223> OTHER INFORMATION: start codon ATG followed by pelB leader
      sequence
<220> FEATURE:
<221> NAME/KEY: misc_feature
<222> LOCATION: (67)..(711)
<223> OTHER INFORMATION: partial DNA fragment of the hemolysin
      III-encoding gene without start codon

<400> SEQUENCE: 42

```
atgaaatacc tgctgccgac cgctgctgct ggtctgctgc tcctcgctgc ccagccggcg     60
atggccaata cttatgtaag gaaccagtt aatgcattta ctcacttagg tggagcgata    120
ttatcattta ttgcgttatt agctatgctt gtgaaagttt ctatcaagat gccatcattt    180
gctgcaatta cagctgttat tttgtttggt attggaatga tggtcccttta tacggcgtca    240 gctgtatatc atagtgttgt ggccaatgaa cgtgttatat acttctttag gaagctagat    300
cattctatga tttttatatt aattgcaggt acatatgcac ccttttgctt aattacatta    360
aattcagcaa gtggtttgct attattttgt ttagtctatg caactgcgat tgtggcatt     420 gtatttaaaa tgttttggtt taattgtcca aggtggttat cgacagcaat ttatattacg    480
atgggttggt taattgtttt attctttgca ccgttagctg agaatttaag tacaggaggc    540 attatttct tagtacttgg tggcattttt tatacaattg gtggatttat ttatggaaca    600
aagccaaaat ggttagagtt taaatatatg gggcatcatg aaattttttca tgttttttgta    660 ttattaggta gtcttgcgca ttttctaagt gtatattgtt acgtaattta a              711
```